(12) United States Patent
Grajcar

(10) Patent No.: US 8,876,313 B2
(45) Date of Patent: Nov. 4, 2014

(54) LIGHT SOURCES ADAPTED TO SPECTRAL SENSITIVITY OF DIURNAL AVIANS AND HUMANS

(71) Applicant: Once Innovations, Inc., Plymouth, MN (US)

(72) Inventor: Zdenko Grajcar, Crystal, MN (US)

(73) Assignee: Once Innovations, Inc., Plymouth, MN (US)

( * ) Notice: Subject to any disclaimer, the term of this patent is extended or adjusted under 35 U.S.C. 154(b) by 0 days.

(21) Appl. No.: 14/033,252

(22) Filed: Sep. 20, 2013

(65) Prior Publication Data

US 2014/0159615 A1 Jun. 12, 2014

Related U.S. Application Data

(63) Continuation-in-part of application No. 13/050,910, filed on Mar. 17, 2011, now Pat. No. 8,596,804.

(60) Provisional application No. 61/703,911, filed on Sep. 21, 2012, provisional application No. 61/314,617, filed on Mar. 17, 2010, provisional application No. 61/314,761, filed on Mar. 17, 2010.

(51) Int. Cl.
| | |
|---|---|
| *F21V 9/08* | (2006.01) |
| *A01K 29/00* | (2006.01) |
| *A01K 1/00* | (2006.01) |
| *F21S 8/00* | (2006.01) |
| *A01K 31/22* | (2006.01) |
| *H05B 37/02* | (2006.01) |
| *A01K 31/00* | (2006.01) |

(52) U.S. Cl.
CPC .............. *H05B 37/02* (2013.01); *A01K 29/00* (2013.01); *A01K 1/00* (2013.01); *F21S 8/006* (2013.01); *A01K 31/22* (2013.01)
USPC ............................ 362/84; 119/437; 313/501

(58) Field of Classification Search
CPC ...... A01K 31/002; A01K 31/18; A01K 31/22
USPC ........ 362/84, 94; 313/498–512; 119/416–537
See application file for complete search history.

(56) References Cited

U.S. PATENT DOCUMENTS 4,239,020 A * 12/1980 Kiyokawa et al. ............ 119/448
6,766,767 B2  7/2004 El Halawani et al.
(Continued)

FOREIGN PATENT DOCUMENTS

WO  WO-2014/047473 A1  3/2014

OTHER PUBLICATIONS

"International Application Serial No. PCT/US2013/060983, International Search Report mailed Jan. 2, 2014", 3 pgs.

(Continued)

*Primary Examiner* — Karabi Guharay
*Assistant Examiner* — Nathaniel Lee
(74) *Attorney, Agent, or Firm* — Schwegman Lundberg & Woessner, P.A.

(57) ABSTRACT

A method of illuminating livestock with artificial light sources. The method includes generating a first light having a first light output that provides white light at typical lumen levels for workers. Then by using a dimming device the light source can be dimmed to provide a blue light at under 3 lumen in order to provide artificial light to the diurnal avians representative of moonlight to cause the occurrence of a predetermined characteristic visual spectral response of the diurnal avian substantially enclosed habitat for diurnal avians.

11 Claims, 16 Drawing Sheets

(56) References Cited

U.S. PATENT DOCUMENTS

| | | | |
|---|---|---|---|
| 6,810,832 B2* | 11/2004 | Ford | 119/437 |
| 2010/0294205 A1* | 11/2010 | Kakimi et al. | 119/437 |
| 2011/0101883 A1 | 5/2011 | Grajcar | |
| 2011/0228515 A1 | 9/2011 | Grajcar | |
| 2012/0186524 A1 | 7/2012 | Grajcar | |

OTHER PUBLICATIONS

"International Application Serial No. PCT/US2013/060983, Written Opinion mailed Jan. 2, 2014", 6 pgs.

"Lighting for Layers", TAS Issue May 17, 2005, Technical Advice Sheet, © British United Turkeys Limited, (2005), 3 pgs.

Cao, J., et al., "Green and Blue Monochromatic Lights Promote Growth and Development of Broilers Via Stimulating Testosterone Secretion and Myofiber Growth", *J. Appl. Poult. Res.*, 17(2), (2008), 211-218.

El Halawani, M. E., et al., "Light Intensity Requirement for Breeder Hen Turkeys", *Minnesota Turkey Gobbles*, 66(4), (Jun. 2009), pp. 4 and 6.

El Halawani, M. E., "Light spectrum and breeder hen turkeys egg production", *Proceedings of the "Midwest Poultry Federation Convention"*, St. Paul., MN, (Oct. 2, 2007), 2 pgs.

Er, D., et al., "Effect of Monochromatic Light on the Egg Quality of Laying Hens", *J. Appl. Poult. Res.*, 16(4), (2007), 605-612.

Ham, A. D., et al., "Colour preferences and colour vision in poultry chicks", *Proc. R. Soc. B*, 274(1621), (2007), 1941-1948.

Olanrewaju, H. A., et al., "A Review of Lighting Programs for Broiler Production", *International Journal of Poultry Science*, 5(4), (2006), 301-308.

Prayitno, D. S., et al., "The Effects of Color and Lighting on the Behavior and Production of Meat Chickens", *Poultry Science*, 76931, (1997), 452-457.

Prescott, N. B., et al., "Spectral sensitivity of the domestic fowl (*Gallus domesticus*)", *British Poultry Science*, 40 (3), (1999), 332-339.

Rahimi, G., et al., "The Effect of Intermittent Lighting Schedule on Broiler Performance", *International Journal of Poultry Science*, 4(6), (2005), 396-398.

Rozenboim, I., et al., "New Monochromatic Light Source for Laying Hens", *Poultry Science*, 77(11), (1998), 1695-1698.

Rozenboim, I., et al., "The effect of a green and blue monochromatic light combination on broiler growth and development", *Poultry Science*, 83(5), (2004), 842-845.

Rozenboim, I., et al., "The Effect of Monochromatic Light on Broiler Growth and Development", *Poultry Science*, 78(1), (1999), 135-138.

Wilson, M., et al., "Impact of Lighting Programs on Broiler Performance", Technical *Focus*, vol. 1, No. 1, © 2011 COBB South Affrica, (2011), 4 pgs.

* cited by examiner

LIGHT SOURCES ADAPTED TO SPECTRAL SENSITIVITY OF DIURNAL AVIANS AND HUMANS

CROSS-REFERENCE TO RELATED APPLICATIONS

This application claims priority to and the benefits of U.S. Provisional Patent Application entitled "Method of Enhancing Growth in Animals Using Light Source" Ser. No. 61/703,911, which was filed by Z. Grajcar on Sep. 21, 2012 and is a continuation in part of U.S. Ser. No. 13/050,910 entitled Light Sources Adapted to Spectral Sensitivity of Diurnal Avians and Humans which was filed by Z. Grajcar on Mar. 17, 2011 and claimed the benefit to U.S. Provisional Patent Application entitled "Light Sources Adapted to Spectral Sensitivity of Diurnal Avians," Ser. No. 61/314,617, which was filed by Z. Grajcar on Mar. 17, 2010, and U.S. Provisional Patent Application entitled "Dimmable LED Light Engine Adapted to Spectral Sensitivity of Diurnal Avians and Humans," Ser. No. 61/314,761, which was filed by Z. Grajcar on Mar. 17, 2010, the entire contents of each of which are incorporated herein by reference.

TECHNICAL FIELD

Various embodiments relate generally to methods and apparatus involving light sources with spectral energy adapted based on light absorbance response of a target avian and humans.

BACKGROUND

This invention relates to enhancing animal growth. More specifically this invention is directed toward using blue wavelength light sources to enhance the growth of animals.

Over time animals as a result of evolution and learned traits as a result of their environment have developed both psychological and physiological reactions to conditions in their environment. Such physiological traits are often easy to identify. These include a chameleon that changes colors to camouflage itself from predators, animals that emit spray or odor, like the skunk to defend itself against predators or the like. Psychological reactions include how mothers of most species will protect their young from harm by hiding eggs or fighting.

While some physiological and psychological changes and effects are obvious and easily identified, others are more subtle. For example, studies and tests have shown that different wavelength light can have different physiological and psychological changes in different animals. The color red and or flashing light has been shown to cause fighting among avian, whereas green and blue colored lighting has been shown to improve the growth of eggs.

Constant blue wavelength lighting at low intensities also cause avians to increase in both size and yield as compared to avians not exposed to constant blue wavelength lighting. Specifically, the blue lighting or moon lighting tends to create a psychological reaction where birds do not stir or move in blue light. Moonlight, or blue light, causes birds, such as turkeys, to freeze and not move because predators often patrol during the night. Thus psychologically the birds in blue light freeze to go undetected from such predators. In chicken, hen and turkey facilities, having the birds freeze is advantageous to prevent birds from fighting and killing one another, thus reducing yield.

One physiological effect blue light has on avian is the production of melatonin in larger levels than other spectrum of wavelength visible light and even darkness. In particular, moonlight causes optimum production of melatonin, not complete darkness. Thus, in an enclosed facility such as a barn, providing blue light instead of complete darkness provides better melatonin outputs and healthier birds.

Another physiological effect blue light has on avian is the production of adrenaline. In particular, even though blue light is typically a sleep state, at the same time a growth state is presented. Thus birds in blue light show significant weight gain as compared to birds not under the influence of blue light.

Lighting can also be an important consideration in other applications, such as livestock production. For example, incandescent or fluorescent lights may be turned on and off to simulate night and day for fowl living indoors. So-called "long day" lighting practices have been proposed to promote increased daily milk production from cows. Some research also suggests, for example, that poultry development behaviors can be influenced by lighting intensity, color, or time schedule. For example, infrared lighting may promote aggression in chickens, while too much darkness might lead to fearfulness.

In general, "poultry" can refer to domesticated fowl raised for meat or eggs. Typical examples of poultry can include chickens, turkeys, ducks, geese, emus, ostriches or game birds. In some cases, poultry are raised in a poultry house. An example poultry house could be 40 feet wide and 600 feet long, with a ceiling that is eleven feet high. For so-called "broilers," young chickens raised for their meat, one research study found that a schedule of intermittent lighting resulted in decreased fat deposition and improved feed conversion efficiency relative to a continuous lighting environment. (See Rahmi, G., et al., The Effect of Intermittent Lighting Schedule on Broiler Performance," Int'l. J. Poultry Sci. 4 (6): 396-398 (2005)).

Various types of lighting have been employed in livestock production facilities. Livestock lighting systems that have been used include incandescent, fluorescent, and more recently, LEDs (light emitting diodes).

In general animal's perception of light involves photoreceptor cells that may be responsive to photons associated with light energy. Photoreceptors may be located in a retina. Photoreceptor cells may be of a rod or cone type. Some cones may be less sensitive to light than rod cells, but cones may allow perception of color.

Therefore, a principle object of the present invention is to increase the growth of an animal using a blue wavelength light source;

Yet another object of the present invention is to provide a lighting assembly that emits light for a predetermined time to increase the yield of a plurality of animals;

These and other object, features and advantages will become apparent from the rest of the specification.

SUMMARY

Various apparatus and associated methods involve a light source that provides light at wavelengths that substantially correlate to local maxima in the spectral sensitivity of a diurnal avian. In an illustrative example, the light source may output light primarily in wavelength bands that are not substantially absorbed by colored oil droplets and/or visual pigment in at least one type of cone in the eye of a diurnal avian. In some embodiments, the light source may include a light-emitting diode (LED) light source. Exemplary light sources may output spectral components to illuminate diurnal avians with local maxima of intensity at wavelengths that substantially correspond to local maxima in a spectral sensitivity visual response characteristic of the diurnal avians.

Various apparatus and associated methods may further involve use of a light source to adjust the intensities of two sets of wavelengths at substantially different rates as a function of electrical input excitation level, while maintaining a substantially white appearance as perceived by a human. In an illustrative example, as input excitation is reduced, the light source may appear to a human spectral sensitivity characteristic to remain substantially white, with a slight shift in hue. As the input excitation is reduced, the light source may simultaneously appears to significantly shift color temperature as it may be perceived by the spectral sensitivity characteristic of a diurnal avian.

Various embodiments may achieve one or more advantages. For example, some embodiments may improve the welfare and/or lifetime development of avians by stimulation with selected wavelengths tailored to the avian's natural physiology. Some implementations may further provide sufficient illumination perceived by humans who may be working in lighted areas. In poultry lighting applications, for example, the LED source may be driven at substantially high excitation to promote healthy growth at early stages of bird development, and gradually dimmed and color-shifted over the bird's life to promote selected behaviors. In some examples, an avian may perceive a rapid reduction in red and a proportionally small reduction in green or blue as may be desirable for broilers, for example. In some examples, an avian may perceive a rapid reduction in blue and a proportionally smaller reduction in green or red as may be desirable for breeder production, for example. Energy efficiency may be enhanced by selecting wavelengths to reduce energy supplied at wavelengths that are not absorbed or useful to the avian. Various embodiments may advantageously permit smooth, time-controlled turn-on/turn-off and incremental intensity adjustments that may minimize stress or simulate natural transitions of the sun, for example.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1:
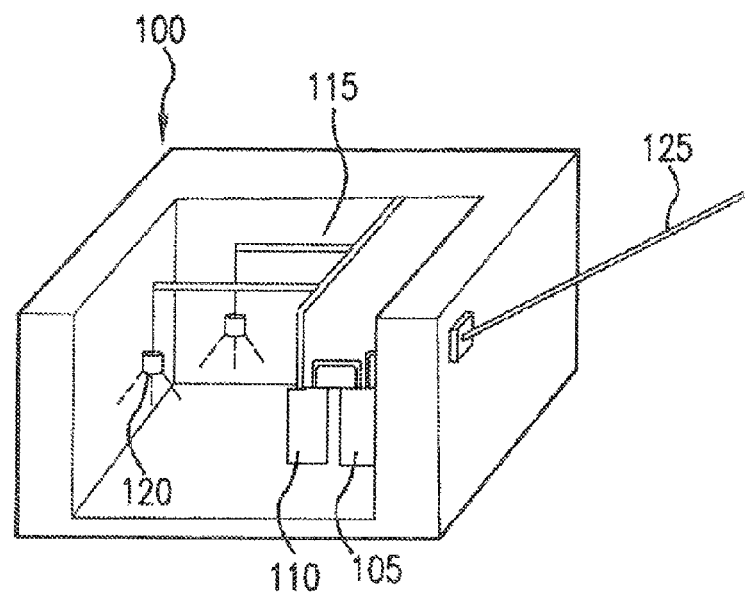
FIG. 1 shows an exemplary lighting installation in a facility for diurnal avians.

FIG. 1 shows an exemplary lighting installation in an agricultural facility for diurnal avians. In this example, FIG. 1 depicts an exemplary poultry facility in which the lighting may provide light energy at wavelengths that substantially correlate to peaks in the spectral sensitivity of the poultry. Various embodiments may advantageously achieve improved energy savings by providing energy primarily in wavelength bands that are not substantially absorbed by colored oil droplets and/or visual pigment in at least one type of cone in the eye of the poultry.

In the example depicted in FIG. 1, a facility 100 includes a circuit breaker panel 105, a controller 110, an electrical distribution system 115, and a number of LED lamp assemblies 120. A pair of conductors 125 provide single phase AC power (e.g., 120-240 VAC, at 50-60 Hz) to the facility from a utility transmission system. Upon entering the facility 100, the AC power is routed through the breaker panel 105 to the controller 110. The controller 110 may be operated (e.g., under control of a programmed processor, or manual input) to provide a controlled reduction of the AC excitation for transmission to the LED lamp assemblies via the electrical distribution system 115. The LED lamp assemblies 120 are located within the facility 100 to artificially illuminate the livestock residing in a livestock area.

The depicted LED lamp assemblies 120 are hanging from electrical cords from an elevated portion of the facility's electrical distribution system 115. In some implementations, the LED lamp assemblies 120 may be mounted as fixtures to infrastructure or supports within the facility 100. The LED lamp assemblies 120 may be located at one or more elevations within the facility, for example, to provide a high bay and/or low bay lighting.

As will be described in further detail with reference to FIGS. 7-10, the lighting system may include one or more types of sources with an intermediate light output signal processed with appropriate wavelength selective conversion to provide light output signals with energy primarily in wavelengths that may be transmitted by the colored oil droplets and pigmentation filters of an avian's cone.

The controller 110 may controllably attenuate the AC excitation voltage and/or current supplied to the LED lamp assemblies 120. By way of example and not limitation, the controller 110 may function as a phase controlled dimmer with leading edge and/or trailing edge phase cutting, pulse width modulation, or amplitude modulation, for example. Exemplary approaches for modulating the AC excitation are described in further detail, for example, at least with reference to FIG. 1 of U.S. Provisional Patent Application entitled "Architecture for High Power Factor and Low Harmonic Distortion LED Lighting," Ser. No. 61/255,491, which was filed by Z. Grajcar on Oct. 28, 2009, the entire contents of which are incorporated herein by reference. The control may be manual or automatically controlled, for example, to provide a desired timing and duration of light and dark cycles (with corresponding color shift provided by operation of examples of the LED light circuit engine). Examples of light systems that incorporate color shift for livestock development are described in further detail, for example, at least with reference to FIGS. 1 and 6C of U.S. Provisional Patent Application entitled "LED Lighting for Livestock Development," Ser. No. 61/255,855, which was filed by Z. Grajcar on Oct. 29, 2009, the entire contents of which are incorporated herein by reference.

In various examples, the controller 110 may include includes a phase control module to control what portion of the AC excitation waveform is substantially blocked from supply to a light engine, where less blockage may correspond to increased excitation level. In other embodiments, the AC excitation may be modulated using one or more other techniques, either alone or in combination. For example, pulse-width modulation, alone or in combination with phase control, may be used to module the AC excitation at modulation frequency that is substantially higher than the fundamental AC excitation frequency.

In some examples, modulation of the AC excitation signal may involve a de-energized mode in which substantially no excitation is applied to the light engine. Accordingly, some implementations may include a disconnect switch (e.g., solid state or mechanical relay) in combination with the excitation modulation control (e.g., phase control module 130). The disconnect switch may be arranged in series to interrupt the supply connection of AC excitation to the light engine. A disconnect switch may be included on the circuit breaker panel 105 that receives AC input from an electrical utility source and distributes the AC excitation to the lamp assemblies 120. In some examples, the disconnect switch may be arranged at a different node in the circuit than the node in the circuit breaker panel 105. Some examples may include the disconnect switch arranged to respond to an automated input signal (e.g., from a programmable controller) and/or to the user input element being placed into a predetermined position (e.g., moved to an end of travel position, pushed in to engage a switch, or the like).

In some implementations, the facility may be used to grow livestock such as poultry, turkey, geese, swine, cows, horses, goats, or the like. By way of example and not limitation, the lighting installation may be used to promote the development of diurnal avians, such as turkeys, ducks, parrots, or chickens including breeders, broilers, or layers, for example.

Figure 2A:
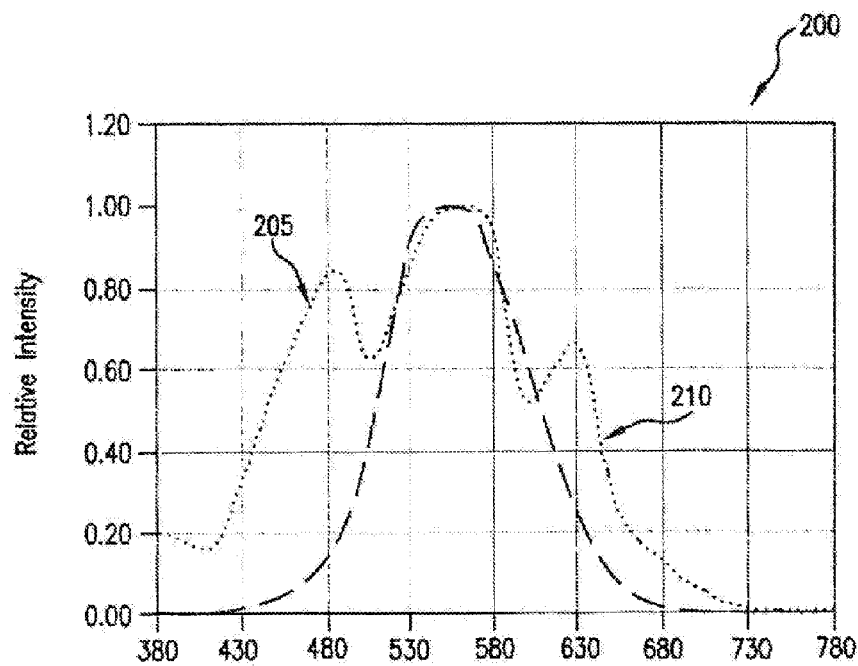
FIG. 2A shows exemplary plots of spectral sensitivity as a function of wavelength for humans and for chickens.

FIG. 2A shows an exemplary plot 200 of spectral sensitivity as a function of wavelength for chickens in a curve 205 and for humans in a curve 210. An exemplary representation of a human's spectral sensitivity, the curve 210 appears approximately as a bell curve with a single peak sensitivity at approximately 555 nm (green). Generally as referred to herein, spectral sensitivity may be understood as a reciprocal measure of the energy or power to provide a particular visual response.

In the depicted figure, the curve 205 provides an exemplary representation of a chicken's spectral sensitivity appears with peaks evident in wavelengths between 380 and 780 nm. In this example, a first peak occurs at about 380 nm, a second peak occurs at about 490 nm, a third peak occurs at about 560 nm, and a fourth peak occurs at about 630 nm. These examples are illustrative and not limiting. Indeed, the amplitude and wavelength and each peak of spectral sensitivity may vary among avian species, among individuals within a species, and for an individual avian over time. For example, an individual diurnal avian may adapt in response to exposure to a set of lighting conditions (e.g., intensity and/or spectral content) by shifting its spectral responsiveness in amplitude and wavelength over time. In some cases, the visual pigmentation may adjust its consistency. In some cases, the number, density and/or distribution of photoreceptors of a particular type may change over time, which may affect a change in an individual avian's spectral sensitivity over time.

According to the exemplary plots in FIG. 2A, chickens and humans have similar sensitivity to green colors (e.g., about 560 nm). Chickens have substantially higher sensitivity to green-blue-ultraviolet (e.g., below about 500 nm) and to orange-red (e.g., above about 600 nm to about 720 nm).

Figure 2B:
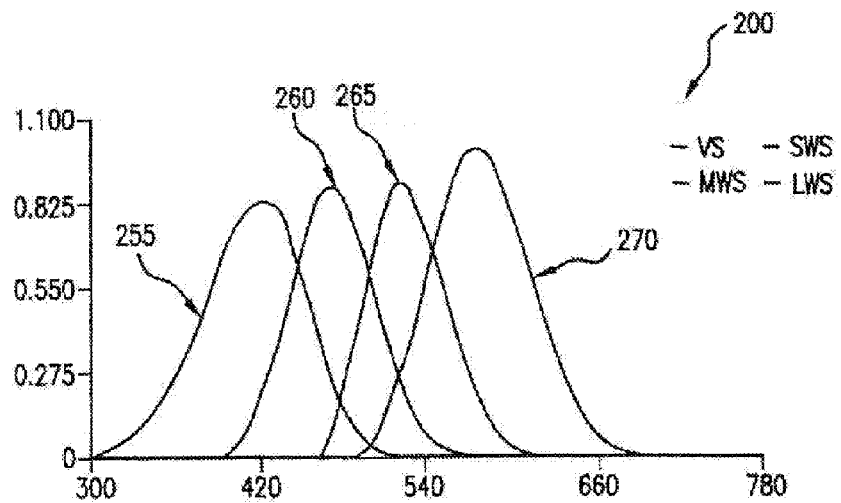
FIG. 2B illustrates exemplary plots of spectral absorbance for four types of oil droplets found in some diurnal avian photoreceptor cells.

By way of illustrative explanation, the tetra-chromatic spectral sensitivity of some diurnal avians may be further understood with reference to FIG. 2B.

FIG. 2B illustrates an exemplary plot 250 of spectral absorbance for four types of oil droplets found in some diurnal avian photoreceptor cells. Unlike some other animals, some avians have photoreceptor cone cells with colored (e.g., pigmented) oil droplets that filter incoming light. Research studies indicate that these oil droplets are highly refractive spherical organelles disposed in some avian cones between the visual pigment and the incident light. As incident light enters the cone of a chicken eye, for example, a colored oil droplet may spectrally filter the light before it reaches the visual pigment. The combined spectral filtering effect of the colored oil droplet and visual pigment may substantially attenuate certain wavelengths, or a band of wavelengths, of the incoming light. Some birds have four types of cones that exhibit different wavelength selective responses. These absorbance characteristics indicate a degree to which incident light will be attenuated as a function of the incident light's wavelength. In an individual cone, with an oil droplet with one of the four depicted absorbance characteristics, light with wavelengths substantially outside of the "bandwidth" of the characteristic may be transmitted substantially without attenuation to a visual pigment element in the cone.

By way of further background as helpful explanation, and not intended to as a limitation, chicken eyes may include four photo-reactive pigments associated with cone cells that provide photopic vision. In contrast, human eye cones have only three pigments. While the human is trichromatic with three pigments, some diurnal avians, such as chickens, may be tetra-chromatic with four pigments.

It is believed that the sensitivity of a particular avian to a particular wavelength is, in part, a function of the number of cones that pass that particular wavelength. Density and distribution of cones of a particular type may thus affect the corresponding sensitivity of the avian to a range of amplitudes of light at any given wavelength.

In some examples, the selective wavelength converter (SWC) may include quantum dots in the optical path. When applied as a film to a die or a lens, for example, the quantum dot material may absorb some of light at one wavelength (e.g., cool blue) and re-emit the light at a substantially different wavelength (e.g., warm red). Accordingly, an optimal spectral output may be pursued by selecting a narrowband source of a first wavelength in conjunction with wavelength selective conversion using quantum dots. Appropriate selection of source and conversion media may advantageously yield a spectral output with energy at one or more wavelengths that each correspond to a peak of the avian spectral sensitivity. Examples of quantum dots are commercially available from QDVision of Massachusetts.

Diurnal avians include, for example, various galliformes (an order of birds that may include turkeys, grouse, chickens, quails, and pheasants) bird species, which are believed to have among the most complex retinae of any vertebrate.

Retinae of diurnal (e.g., active during day) birds may include a single class of medium wavelength sensitive (MWS) rod, and four classes of single cone with maximum sensitivities to different regions of the spectrum. The single cones may include oil droplets at the distal end of their inner segments. Oil droplets are highly refractive spherical organelles located in the photoreceptor between the visual pigment and the incident light. In all but one of the single cone types, the oil droplets contain short-wavelength absorbing carotenoid pigments that spectrally filter the incident light before it reaches the visual pigment in the outer segments. Pigmented oil droplets act as long-pass cutoff filters and shift the effective sensitivity peak of the cone to a wavelength longer than the long wavelength portion of the passband of the visual pigment contained in the outer segment. They also narrow the spectral sensitivity function of the cone.

In addition to the retinal photoreceptors in the eye, some species have other photoreceptors that may contribute to the overall spectral sensitivity. For example, some species (e.g., chicken) have dorsal photoreceptors oriented in a generally skyward direction when the avian is standing erect. A lighting system may specifically target dorsal photoreceptors with directional (e.g., beam pattern) lighting from above, for example.

Figure 3:
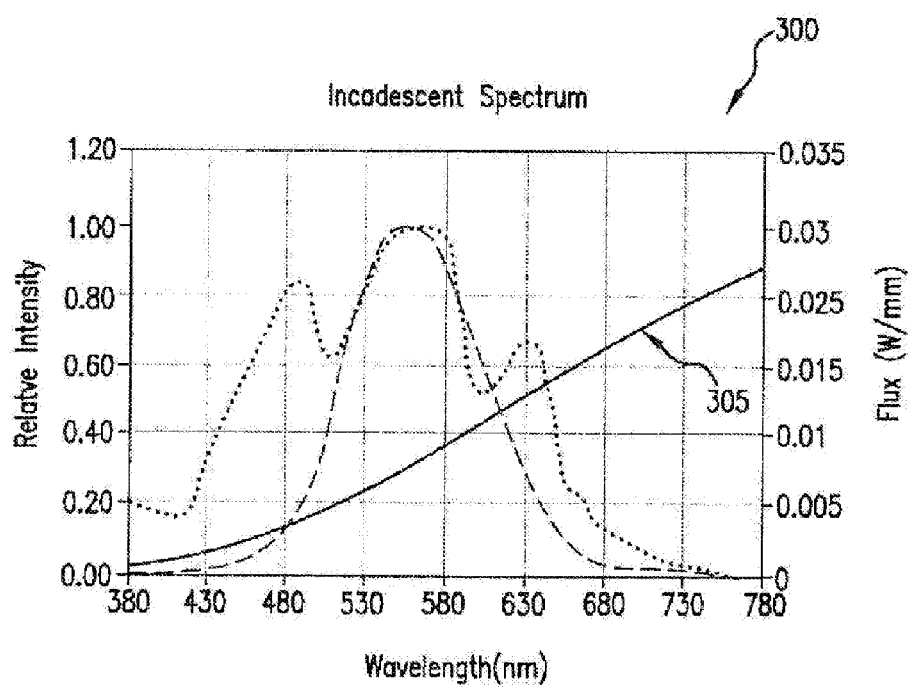
FIGS. 3-5 depict spectral content of exemplary incandescent, fluorescent, and light emitting diode (LED) sources, respectively.
Figure 4:
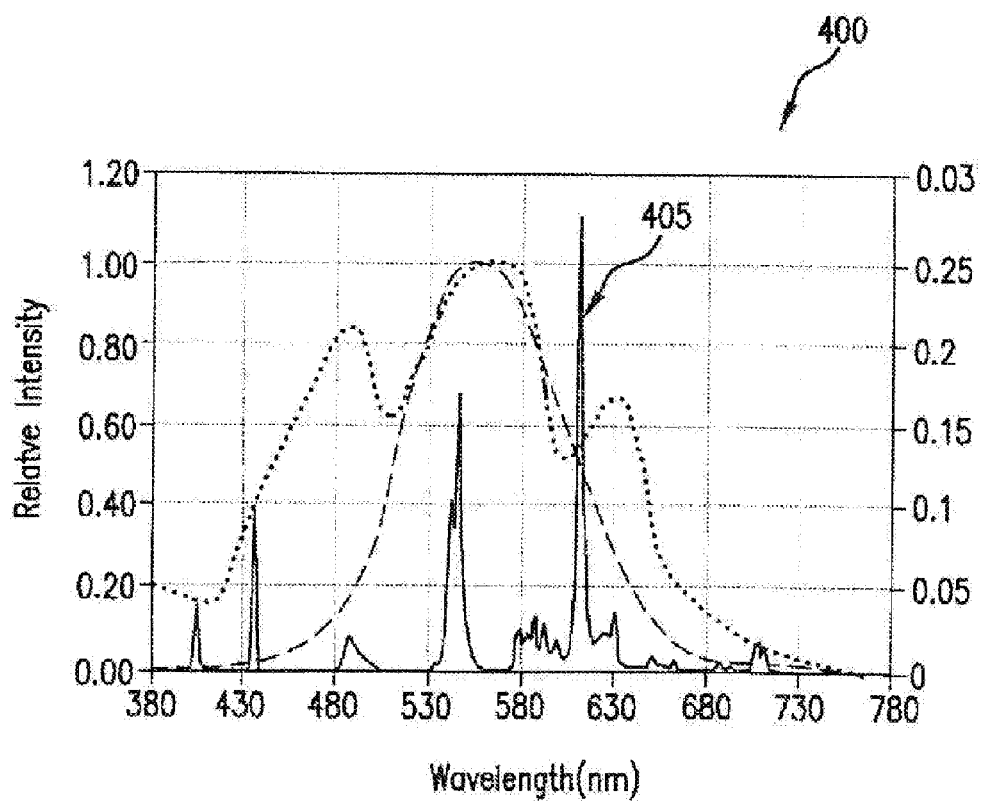
Figure 5:
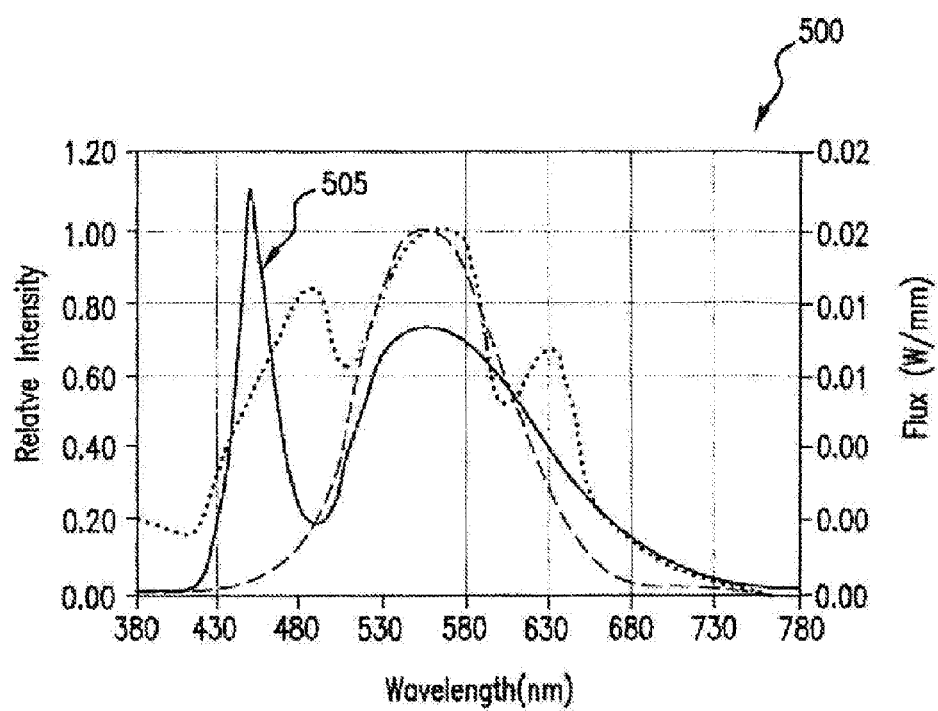

FIGS. 3-5 depict spectral content of exemplary incandescent, fluorescent, and light emitting diode (LED) sources, respectively. The output spectra of these sources are individually overlaid on the relative spectral sensitivity characteristics as described with reference to FIG. 2A.

FIG. 3 depicts a plot of an incandescent spectrum 300. Curve 305 reflects an experimentally measured spectral characteristic for a 60 Watt DOUBLE LIFE™ incandescent bulb, commercially available from General Electric.

FIG. 4 depicts a plot of an incandescent spectrum 400. Curve 405 reflects an experimentally measured spectral characteristic for a 23 Watt SLS-23 fluorescent bulb, commercially available from Philips Lighting Company of New Jersey.

FIG. 5 depicts a plot of an incandescent spectrum. Curve 505 reflects an experimentally measured spectral characteristic for an arrangement of high power 1 W LEDs, model EHP-A21/GT46H-P01/TR, commercially available from Everlight Electronics Co., Ltd. of Taiwan.

Figure 6:
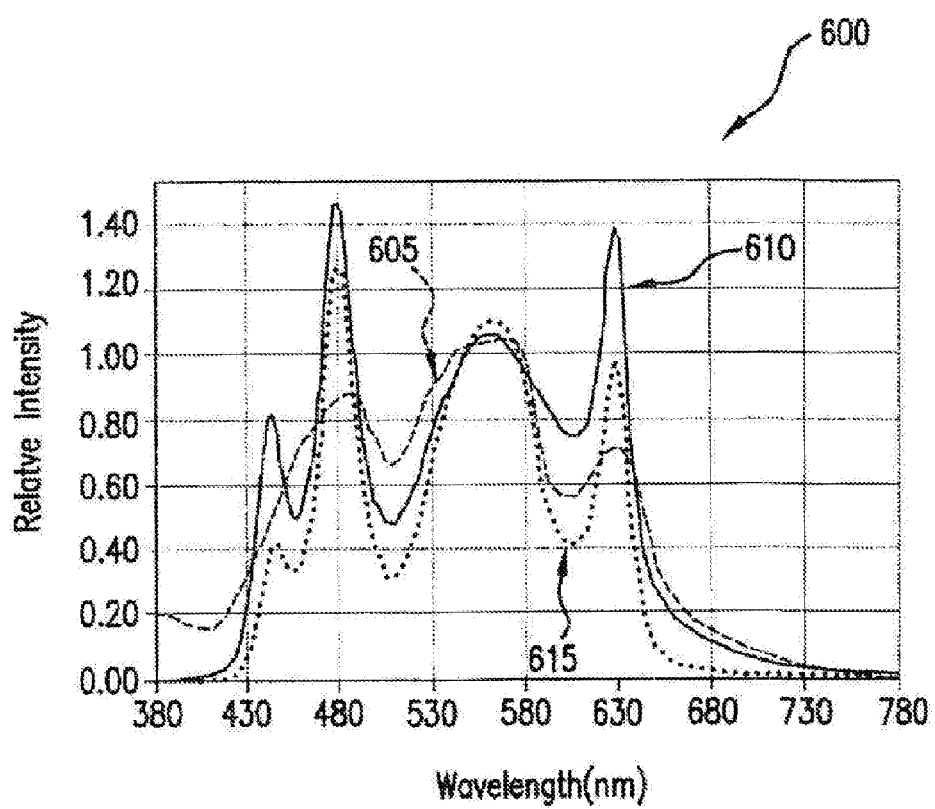
FIG. 6 depicts a characteristic for an exemplary composite source adapted to provide light energy at wavelengths that substantially correlate to peaks in the spectral sensitivity of a chicken.
Figure 7A:
FIGS. 7A-7D depict exemplary implementations of sources to form a composite source adapted to provide light energy at wavelengths that substantially correlate to peaks in the spectral sensitivity of a diurnal avian.
Figure 7B:
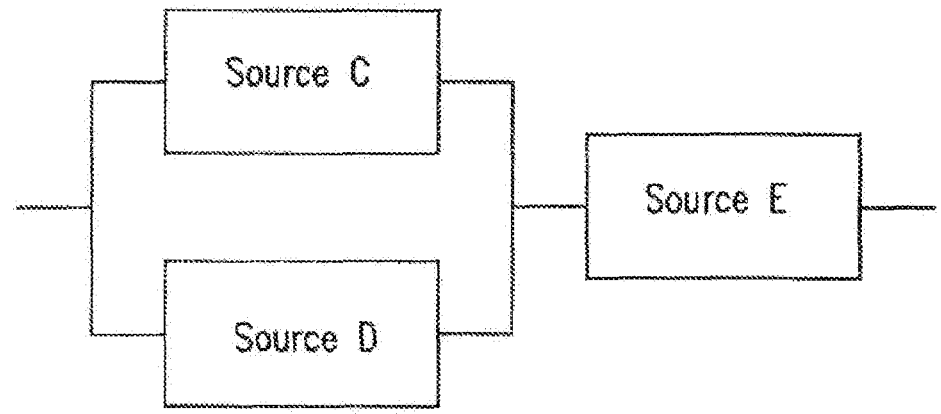
Figure 7C:
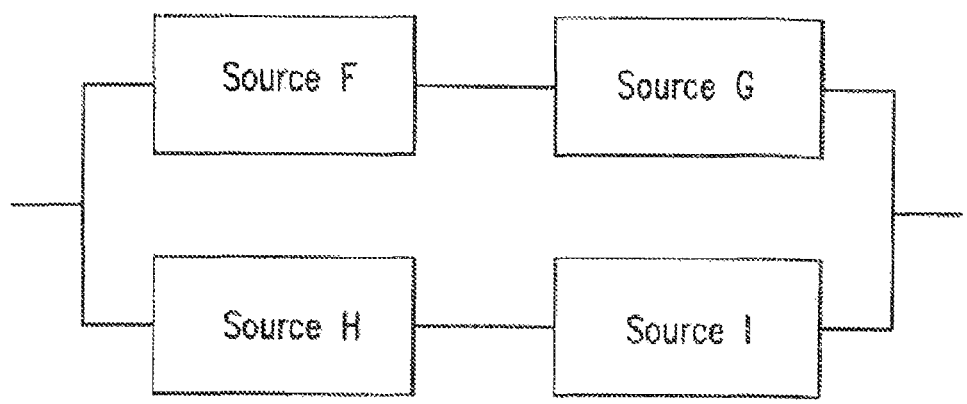
Figure 7D:
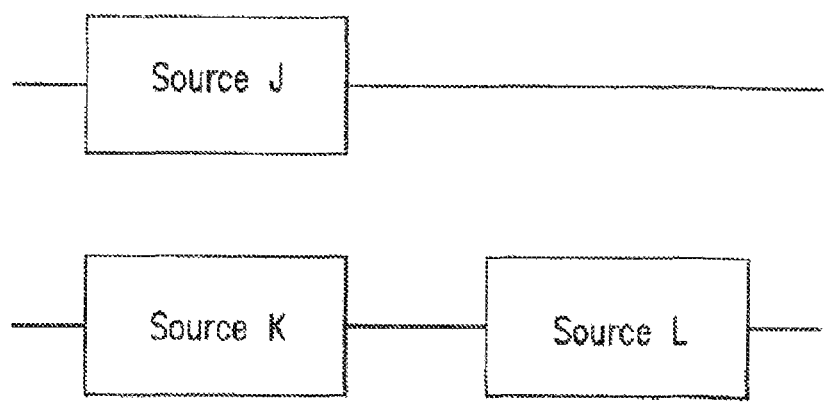

FIG. 6 depicts a characteristic for an exemplary composite source adapted to provide light energy at wavelengths that substantially correlate to peaks in the spectral sensitivity of a chicken. A plot 600 indicates relative intensity as a function of wavelength (nm) for: a domestic fowl relative eye response curve 605, an exemplary composite source 610, a curve 615 representing what the domestic fowl perceives from the composite source. Exemplary implementations that may yield the depicted source spectral output 610 are described with reference to FIGS. 7-8.

In an illustrative example, the curve 615 represents an exemplary characteristic visual response to the composite light source spectrum as perceived by the chicken 615. The visual response characteristic is a function of the spectral sensitivity to the light source at each wavelength, and the sensitivity of the chicken at the corresponding wavelength.

In particular, the depicted light source characteristic curve 610 has peak of intensity at about 480 nm. A pass band (e.g., between about 460-500 nm) associated with this peak represents energy that is substantially within the bandwidth of the second peak of the chicken spectral sensitivity around about 500 nm, which has an approximate bandwidth that may be considered to include at least between about 450-520 nm. Similarly, the composite source includes peaks that lie substantially within a bandwidth of the chicken's spectral sensitivity peaks at about 560 nm and about 630 nm, respectively.

Moreover, the composite source exhibits relatively low energy content, or local minima of intensity, at wavelengths that substantially correspond to local minima of the chicken's spectral sensitivity. In the depicted example, the composite source may be seen to have substantially minimal or local intensity minima at corresponding sensitivity minima (e.g., about 410 nm, 510 nm, 605 nm, or above about 680 nm in this example).

FIG. 7 depicts exemplary implementations of sources to form a composite source adapted to provide light energy at wavelengths that substantially correlate to peaks in the spectral sensitivity of a diurnal avian. Each implementation may be formed from a combination of one or more types of sources, including, but not necessarily limited to, the sources described with reference to FIGS. 3-5. Some composite sources may further include metal halide, high pressure sodium, or other high intensity discharge source. A composite source may be formed of a single type of source, alone or in combination with one or more sources, to obtain a composite source adapted to provide light energy at wavelengths that substantially correlate to peaks in a spectral sensitivity of a specified diurnal avian.

FIGS. 7 a-7 d depict exemplary networks of two or more sources A-L to form a composite source. In some examples, each of the sources A-L may each individually include a network that includes one or more elements of a single type of source (e.g., at least one fluorescent bulb, a network of one or more LEDs, an array of incandescent bulbs). Each network may include sources having selected wavelength output spectra to achieve the specified composite output that substantially matches at least portions of the diurnal avian's spectral sensitivity characteristics. Some exemplary networks may include two or more elements of the same source type arranged in series, parallel, and/or combinations of series and parallel, including two or more parallel branches. In FIG. 7 a, for example, the same excitation current flows through both of the sources A,B, and the excitation may be either AC or DC. In FIG. 7 b, for example, sources J and K-L are independent branches that may be independently excited with different voltage and/or current, and the excitation to either branch may be either AC or DC.

Figure 8A:
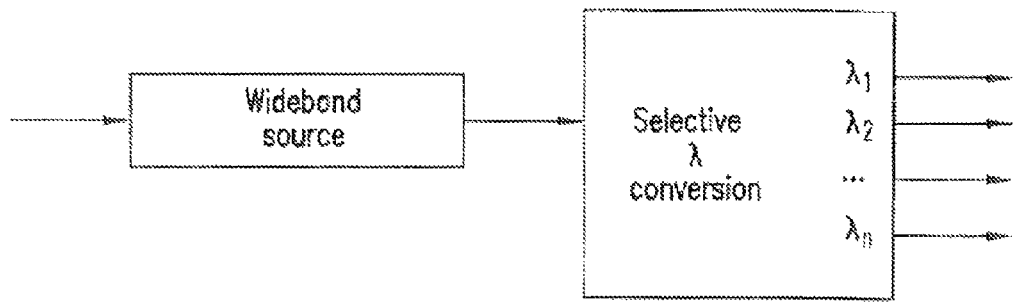
FIGS. 8A-8C show exemplary architectures for implementing a composite source from various sources.

FIG. 8 shows exemplary architectures for implementing a composite source from various sources.

In FIG. 8 a, a wideband source supplies a light signal to be processed by a selective wavelength converter (SWC). The SWC processes the light signal from the wideband light source using apparatus or techniques to substantially shift energy content at one or more selected wavelengths to different wavelengths. By appropriate selection of source and SWC, a composite source may be created to output light at wavelengths that substantially match a diurnal avian's spectral characteristic.

In some embodiments, the selective wavelength converter (SWC) may include quantum dots in the optical path, as described with reference to FIG. 2B.

In some other embodiments, the SWC may include a phosphor-like material that emits light at one wavelength in response to stimulation at a different wavelength.

In some examples, the composite source may use, for example, a number of incandescent bulbs arranged in series as a substantially wideband source. A film of quantum dots and/or phosphors may be provided in the optical path of the LED output to shift some energy, for example, from a red spectrum to a green and/or a blue portion of the spectrum. The resulting output of the composite source may substantially match (e.g., lie substantially within the pass band of) at least three of the peaks and at least two local minima of the diurnal avian's spectral sensitivity response characteristic.

Figure 8B:
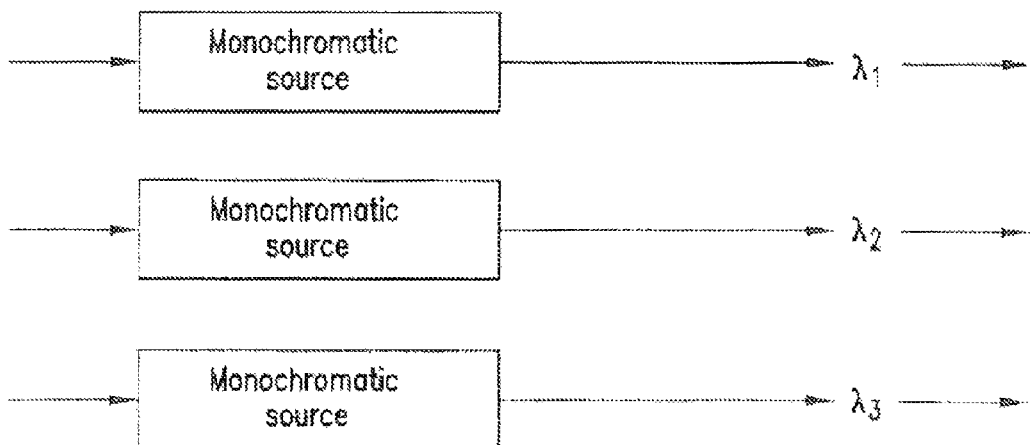

FIG. 8b depicts an exemplary composite sourced formed by three independent monochromatic sources. For example, a network of green, red, and blue LEDs may output arranged in a network (e.g., in accordance with any of FIGS. 7a-7d) combined light signal that substantially matches a sensitivity spectral characteristic of a chicken.

Figure 8C:
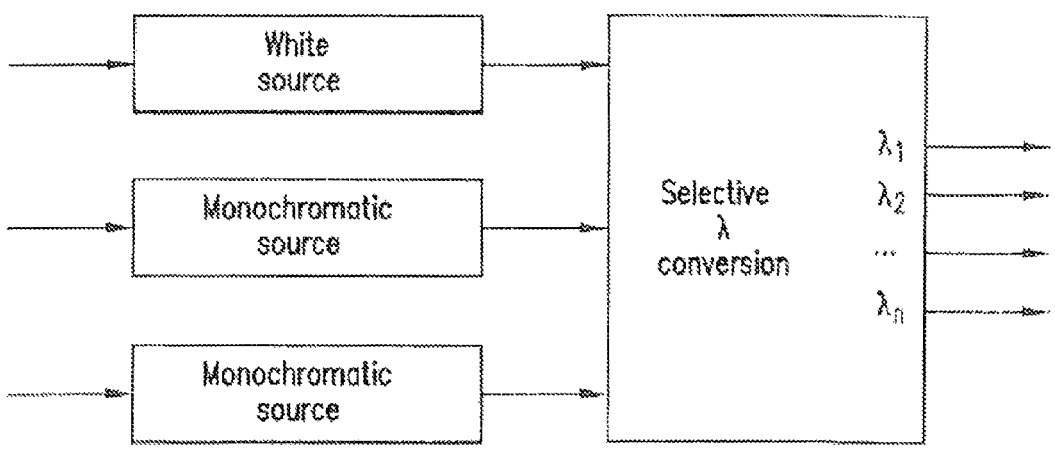

FIG. 8c depicts an exemplary composite sourced formed by a white source and two independent monochromatic sources in conjunction with a SWC. For example, a network of cool white LEDs may serve as the "white" source, and red and/or blue LEDs may serve as the two monochromatic sources. The SWC may shift at least some energy in order to provide peaks of the composite light source intensity that fall substantially within a pass band of at least 2 of the peaks of the avian spectral sensitivity characteristic.

Figure 9:
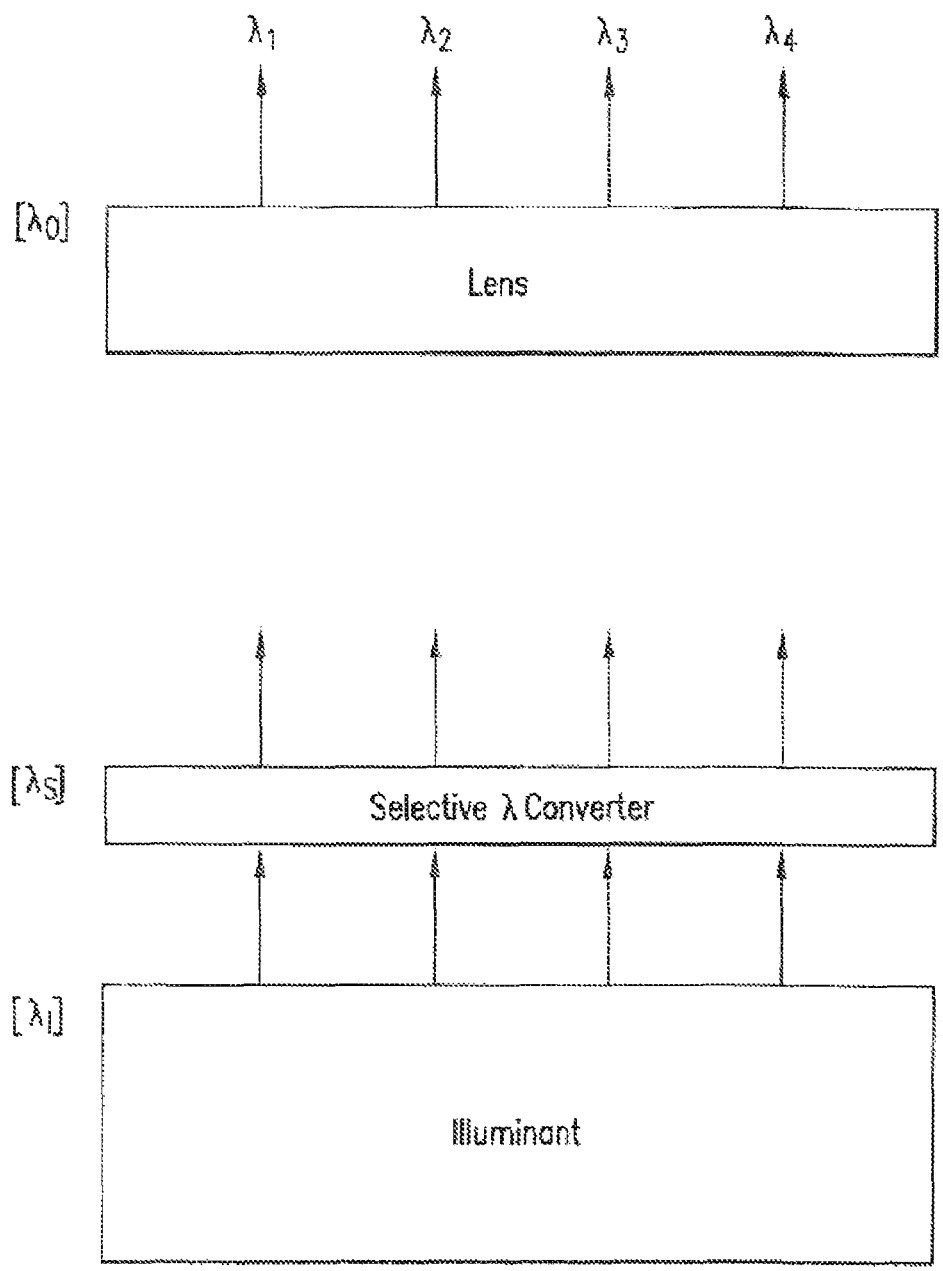
FIG. 9 depicts an exemplary light source device adapted to substantially match at least portions of the diurnal avian's spectral sensitivity characteristics.

FIG. 9 depicts an exemplary light source device adapted to substantially match at least portions of the diurnal avian's spectral sensitivity characteristics. In this figure, an illuminant substrate outputs a first set of wavelengths that are directed generally upward from a top surface of the illuminant. The illuminant may include one or more units of a source (e.g., one or more LEDs, fluorescent elements, incandescent elements).

The first set of wavelengths pass through a SWC provided as a film or layer in the optical path. The SWC may be implemented in various embodiments as described above, including quantum dots, phosphors, or a combination thereof. The spectral content of the light emitted by the SWC has at least some energy at wavelengths that have shifted with respect to the spectral content emitted by the illuminant. The optical path in this example further includes a lens, which may or may not incorporate another SWC element to further tailor the spectral content of the composite source to more accurately match the spectral sensitivity characteristic of the avian.

Figure 10:
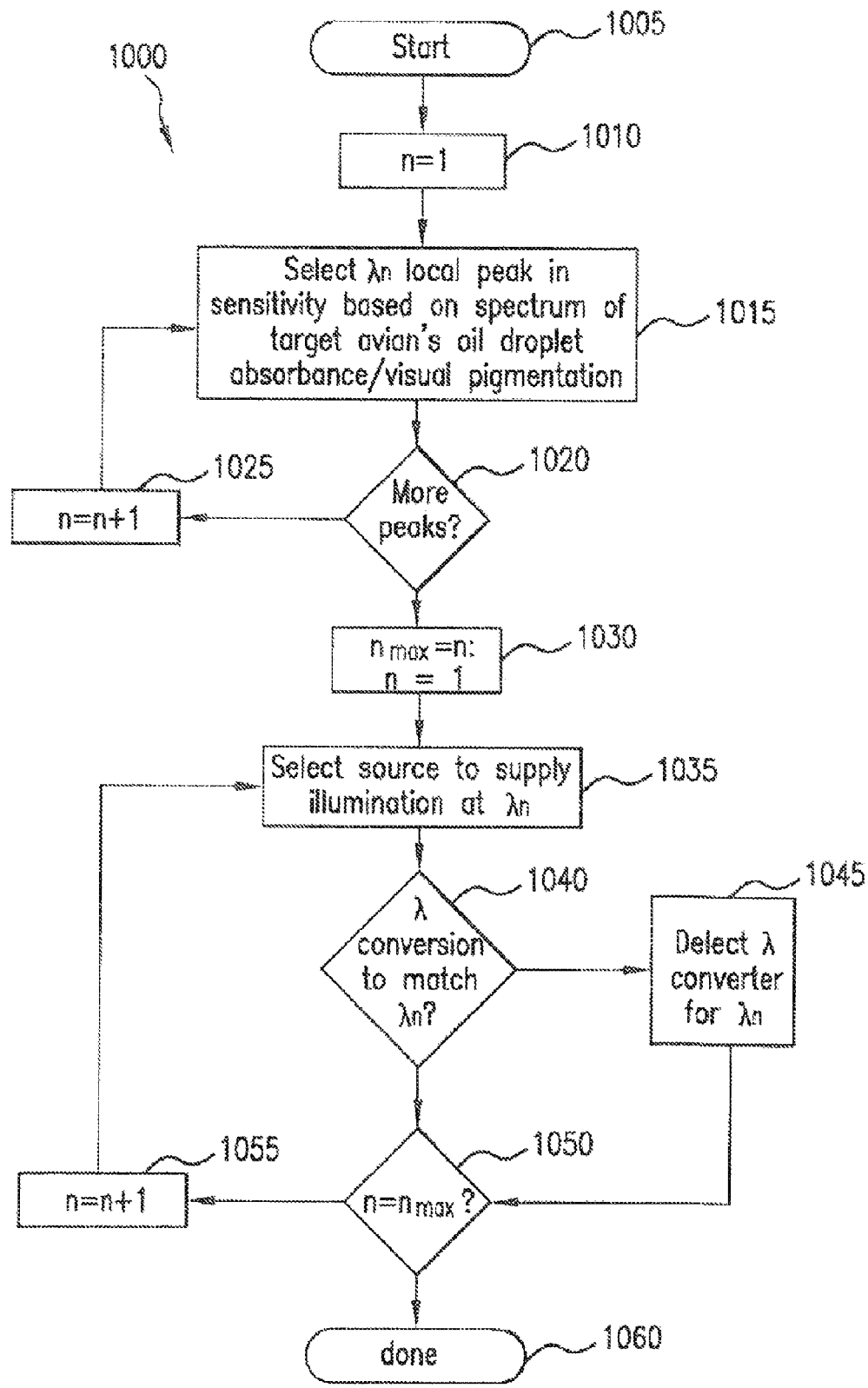
FIG. 10 is a flowchart of an exemplary method to provide a composite source adapted to provide light energy at wavelengths that substantially correlate to peaks in the spectral sensitivity of a diurnal avian.

FIG. 10 is a flowchart of an exemplary method to provide a composite source adapted to provide light energy at wavelengths that substantially correlate to peaks in the spectral sensitivity of a diurnal avian. The method 1000 may be implemented by a processor executing operations according to a set of instructions retrieved from a data store. Some or all of the steps of the method may be implemented by at least one processor that is included in at least one computer, such as a desktop, laptop, server, or portable digital device.

When started at step 1005, the method 1000 includes a step 1010 for initializing an index (n) to one. Then, at step 1015, the processor selects a wavelength for the index at which there is a local peak in sensitivity based on a spectrum of the target avian's oil droplet absorbance and visual pigmentation. In some embodiments, oil droplet absorbance information and information about spectral transmission through visual pigments for a particular species of diurnal avian may be stored as records in a data store. If there are more peaks of the sensitivity to identify at step 1020, then the index increments and the wavelength selection step 1015 is repeated.

When all the peaks have been identified, at step 1030 the maximum number of peaks is stored (nmax), and the index is reset to one. Then, the processor performs operations to select a source to supply illumination at the wavelength for the index at step 1035.

If, at step 1040, a selective wavelength conversion is required to match the source wavelength spectrum to the selected wavelength at the index, then the processor performs operations at step 1045 to select a selective wavelength converter (SWC) suitable to convert the selected source to the selected wavelength for the index. For example, the SWC may be a phosphor alone or in combination with a film of quantum dots.

If the index has not reached nmax at step 1050, then the index increments at step 1055 and the source selection step 1035 is repeated. When all the selected peaks have been associated with a source and any required SWC, the method ends at step 1060.

FIG. 11 shows schematics of exemplary conditioning circuits for an LED light engine with selective current diversion to bypass a group of LEDs while AC input excitation is below a predetermined level, with spectral output to substantially match about three spectral sensitivity peaks of a diurnal avian and appear substantially white to human vision. In particular, the combination of LED outputs may provide a spectral energy that substantially matches a spectral sensitivity of a selected diurnal avian. In some embodiments, the LED output spectrum may be provided by an LED (or combination of LEDs) in combination with a selective wavelength converter (SWC), examples of which are described with reference, for example, at least to FIGS. 8-10 of U.S. Provisional Patent Application entitled "Light Sources Adapted to Spectral Sensitivity of Diurnal Avians," Ser. No. 61/314,617, which was filed by Z. Grajcar on Mar. 17, 2010, the entire contents of which are incorporated herein by reference.

Figure 11A:
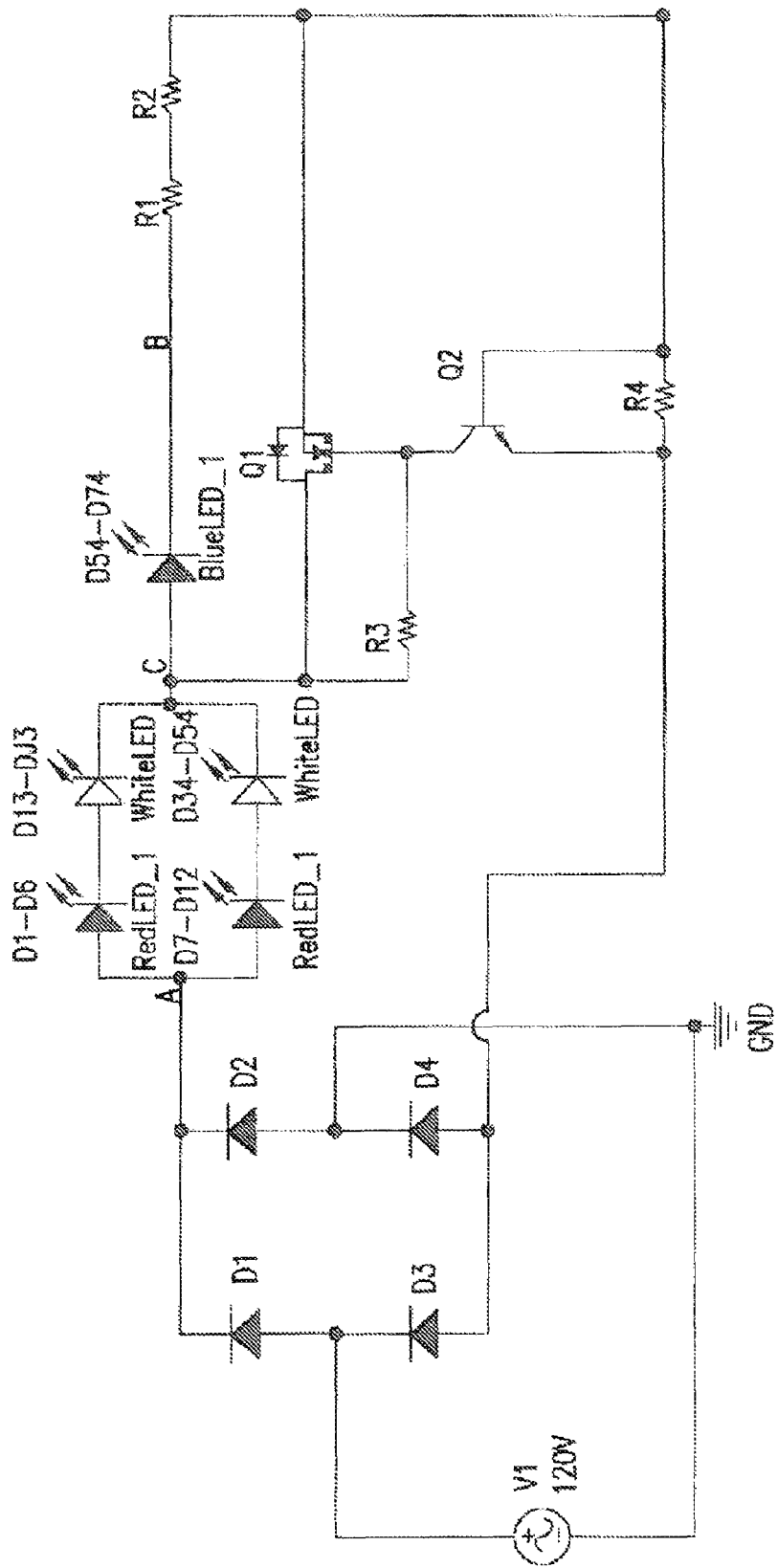
FIGS. 11A-11B show schematics of exemplary conditioning circuits for an LED light engine with selective current diversion to bypass a group of LEDs while AC input excitation is below a predetermined level, with spectral output to substantially match about three spectral sensitivity peaks of a diurnal avian and appear substantially white to human vision.

FIG. 11(a) depicts 40 white and 12 red LEDs in a first group between nodes A,C, referred to herein as the "RUN" group of LEDs, and with 10 blue LEDs in a second group between nodes C, B, referred to herein as the "BYPASS" group of LEDs.

Figure 11B:
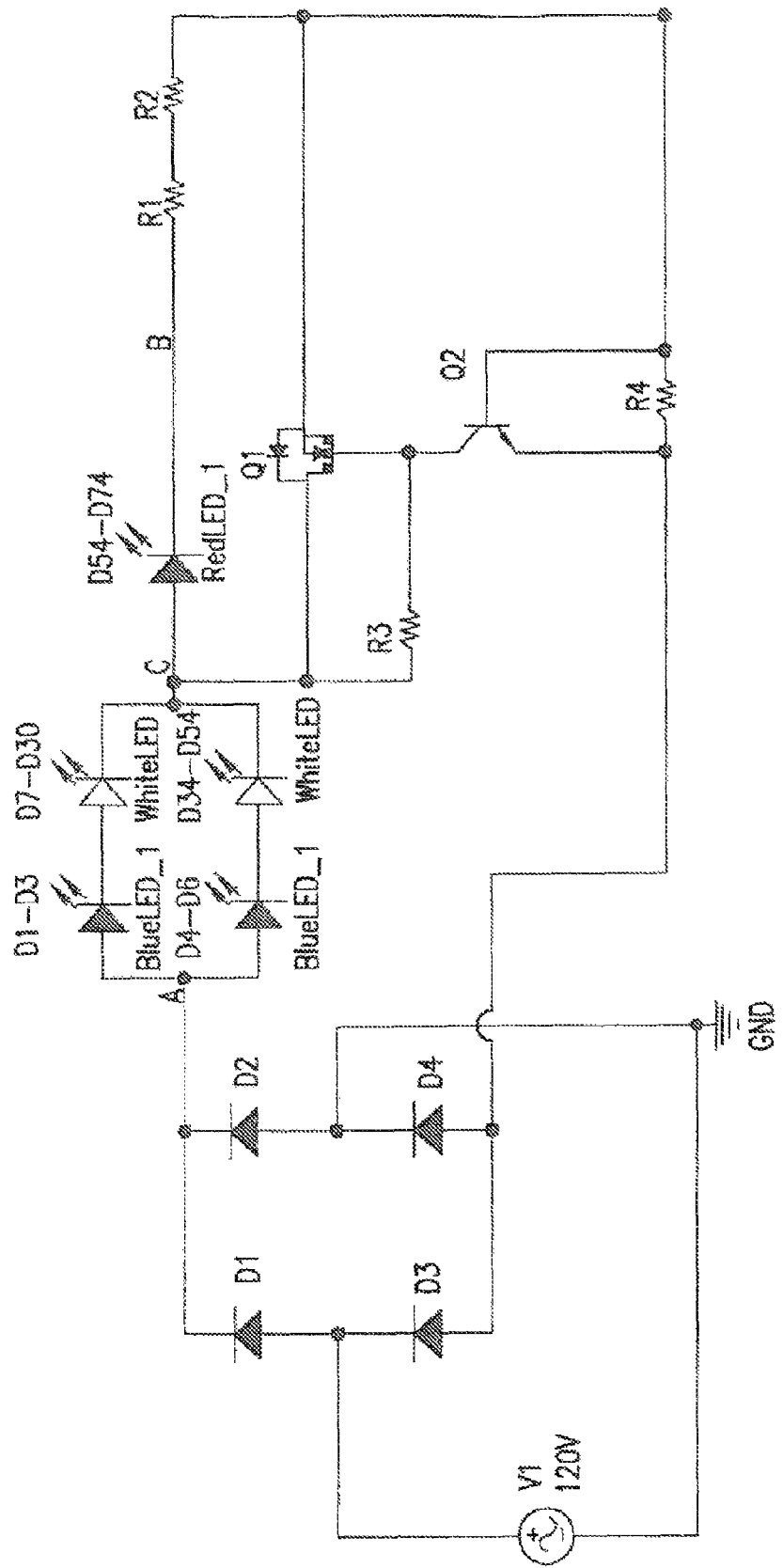

FIG. 11(b) depicts 48 white and 6 blue LEDs in the "RUN" group, and 20 red LEDs in the "BYPASS" group.

As depicted, the exemplary light engine includes a circuit excited by an AC (e.g., substantially sinusoidal) voltage source V1. The AC excitation from the source V1 is rectified by diodes D1-D4. A positive output of the rectifier, at node A, supplies rectified current to a first set of LEDs, LED1-LED54, (RUN LEDs) which are connected as a network of two parallel strings from node A to node C.

At node C, current may divide between a first path through a second set of LEDs and a second path through a current diversion circuit. The first path from node C flows through the second set of LEDs, LED55-LED74, (BYPASS LEDs) to anode B, and then on through a series resistance, R1 and R2. In some embodiments, a peak current drawn from source V1 may depend substantially on the series resistance R1 and R2.

The second path from node C flows through a selective current diversion circuit that includes Q1, Q2, R3, and R4. In some examples, the current drawn from the source V1 at intermediate excitation levels may depend substantially on the selective current diversion circuit.

In some embodiments, the schematics of FIGS. 11(a,b) may be modified to arrange LEDs in different series and/or parallel networks. For example, the RUN group in FIG. 11(a) may include three or more branches of LEDs red and/or white LEDs. In another example, the RUN group in FIG. 11(b) may include one or more blue and/or white LEDs in a serial and/or parallel network examples that is itself in series with the depicted parallel network. In another embodiment, the BYPASS group of LEDS may include additional LEDs to tailor the spectral output, such as a number of white (e.g., cool white) LED sources.

The RUN and BYPASS groups of LED1-LED74 may be in a single module such as a hybrid circuit module or assembly. In some examples, the LEDs LED 1-LED74 may be arranged as individual or discrete packages and/or in groups of LEDs. The individual LEDs may output all the same color spectrum in some examples. In other examples, one or more of the LEDs may output substantially different colors than the remaining LEDs. Various embodiments may utilize inexpensive low CRI (color rendering index) LEDs.

The number of LEDs is exemplary, and is not meant as limiting. For example, the number of red or blue LEDs may be 1, 2, 3, 4, 5, 6, 7, 8, 9, 10, 11, 12, 13, 14, 15, 16, 20, 24, or at least 30 or more, for operation on 120 VAC excitation, and may be further adjusted according to brightness, spectral content, other LEDs in the circuit, circuit arrangement (e.g., 2 or more parallel branches) and/or LED forward voltage, for example. The number of white LEDs may be increased using the depicted arrangement to include from about 18 to about 38 white LEDs, such as between about 21 to 27 LEDS.

The number of LEDs may be designed according to the forward voltage drop of the selected LEDs and the applied excitation amplitude supplied from the source V1. The number of LEDs in the first set between nodes A, C may be reduced to achieve an improved power factor. The LEDs between nodes A, C may be advantageously placed in parallel to substantially balance the loading of the two sets of LEDs according to their relative duty cycle, for example. In some implementations, current may flow through the RUN LED group whenever input current is being drawn from the source V1, while the current through the BYPASS LED group may flow substantially only above a threshold voltage excitation from the source V1.

Suitable LEDs may be selected according to their color output to create a combine spectral output in accordance, for example, with the exemplary spectra described with reference to FIG. 12. By way of example, and not limitation, a representative example of suitable LEDs may include models EHP-A21/UB01H-P01/TR or EHP-A21/GT46H-P01/TR, which are commercially available from Everlight Electronics Co., Ltd. of Taiwan; models SLHNNWW629T00S0S373 or SPMRED3215A0AEFCSC, which are commercially available from Samsung LED Co., LTD. of Korea.

The spectral output of one or more of the LEDs may be tailored by converting energy from one wavelength to a different wavelength, for example, using selective wavelength conversion (SWC) techniques. Examples of SWC techniques using phosphors or quantum dots are described in further detail with reference to at least FIGS. 8-9 of U.S. Ser. No. 61/314,617.

Figure 12A:
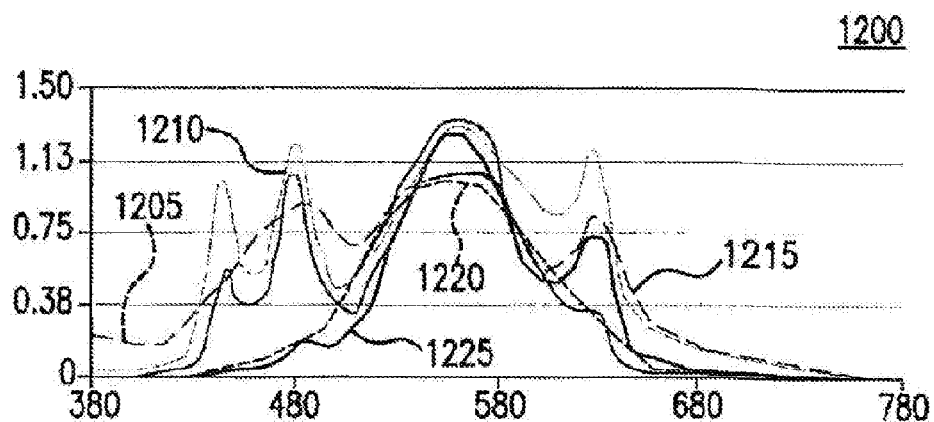
FIGS. 12A-12C show relative plots of human and chicken spectral sensitivity that may be provided by the light engines described with reference to FIGS. 11(a,b).

FIG. 12 shows relative plots of human and chicken spectral sensitivity that may be provided by the light engines described with reference to FIGS. 11(a,b). The exemplary human characteristic spectral sensitivity curve 1220 (e.g., bell curve shape plot) and an exemplary chicken predetermined characteristic spectral sensitivity curve 1205 (3 peaks between 400-680 nm) depict spectral sensitivities shown in dashed lines, examples of which are discussed in further detail with reference to at least FIG. 12A of U.S. Ser. No. 61/314,617.

FIG. 12(a) depicts that an exemplary intensity plot 1210 for an exemplary light engine at a first intensity level, which may be considered here to be 100% full intensity for purposes of illustration. A chicken visual response curve 1215 and a human visual response curve 1225 depict the respective responses to the light source curve 1210. The light engine output may be produced, for example, by either of the circuits of FIGS. 11(a,b) operating at full intensity.

In this illustrative example, the human visual response generally matches the shape and bandwidth of the bell curve for the human spectral sensitivity characteristic.

The chicken's visual response extends to wavelengths above and below the "pass band" of the human characteristic. The chicken visual response peaks around wavelengths at which the chicken spectral sensitivity and the LED light source have their local maxima (e.g., around 480 nm, 560 nm, and 600 nm).

Figure 12B:
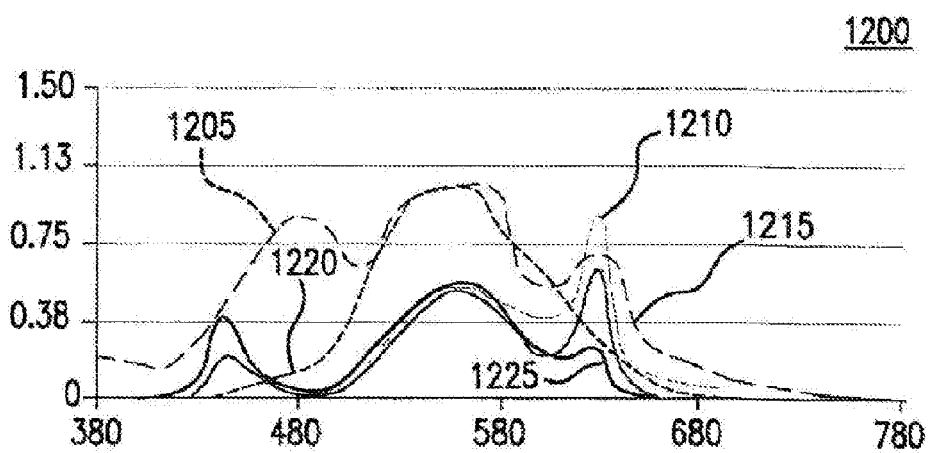

FIG. 12(b) represents exemplary intensity plots for a light engine, including the circuit of FIG. 11(a), at a first reduced intensity level, which may be considered here to be 40% full intensity for purposes of illustration. The chicken 1215 and human 1225 visual responses to this light source 1210 are also plotted. The light engine output may be produced by the circuit of FIG. 11(a) operating at about 40% intensity (e.g., a reduced input excitation voltage level).

FIG. 12(b) illustrates that LED source intensity has a different spectral profile than FIG. 12(a). In particular, blue colors (e.g., wavelengths below 470 nm) associated with the blue LEDs in the BYPASS LED group are substantially more attenuated than the intensity of red colors (e.g., wavelengths above about 620 nm) associated with the red LEDs in the RUN group of FIG. 1(a). The different rates of attenuation may be accounted for by the conditioning operations of the selective diversion circuitry.

In response to the light source spectral profile of FIG. 12(b), the human visual response generally matches the shape and bandwidth of the bell curve for the human spectral sensitivity characteristic. As such, a typical human may perceive the light as dimmer, but still with the appearance of white light with reasonably good color rendering. The human perception may be considered to be substantially white with a slight reddish hue.

The chicken's visual response to the source includes substantially reduced perception of most blue color, while maintaining substantial green and red, albeit at a partially reduced intensity compared to FIG. 12(a). As an illustrative example, this reddish color may advantageously conserve energy otherwise supplied in the blue spectrum, while being perceived by the chicken as reasonably bright illumination with red content that may, according to some research, promote breeding activities.

As such, the circuit of FIG. 11(a) may be advantageous as a highly efficient lighting system tailored for breeder chickens, for example. Even though the chicken perceives a substantial color shift towards the red spectrum and away from blue, embodiments of the circuit of FIG. 11(a) may further be advantageous as a light to permit humans to see with good color rendering over a wide dimming range.

Figure 12C:
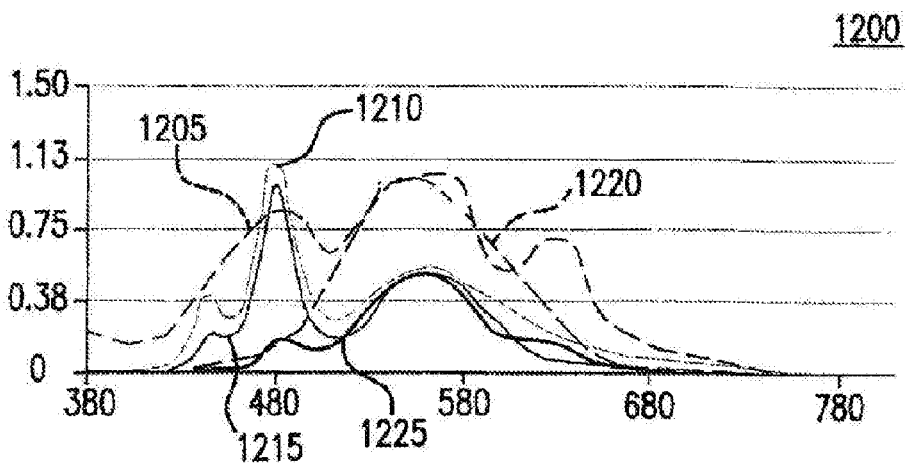

FIG. 12(c) represents exemplary intensity plots for a light engine, including the circuit of FIG. 11(b), at a first reduced intensity level, which may be considered here to be 40% full intensity for purposes of illustration. The chicken 1215 and human 1225 visual responses to this light source 1210 are also plotted. The light engine output may be produced by the circuit of FIG. 1(b) operating at about 40% intensity (e.g., a reduced input excitation voltage level).

FIG. 12(c) illustrates that LED source intensity has a different spectral profile than FIG. 12(a). In particular, red colors associated with the red LEDs in the BYPASS LED group are substantially more attenuated than the intensity of blue colors associated with the blue and/or cool white LEDs in the RUN group of FIG. 11(b). The different rates of attenuation may be accounted for by the conditioning operations of the selective diversion circuitry.

In response to the light source spectral profile of FIG. 12(c), the human visual response generally matches the shape and bandwidth of the bell curve for the human spectral sensitivity characteristic. As such, a typical human may perceive the light as dimmer, but still with the appearance of white light with reasonably good color rendering. The human perception may be considered to be substantially white with a slight bluish hue (e.g., due to a small peak around 480 nm in this example). The chicken's visual response to the source includes substantially reduced perception of most red color, while maintaining substantial green and blue, albeit at a lower intensity compared to FIG. 12(a). As an illustrative example, this bluish color may advantageously conserve energy otherwise supplied in the red spectrum, while being perceived by the chicken as reasonably bright illumination with blue-green content that may, according to some research, promote growth and non-aggressive behaviors.

As such, the circuit of FIG. 11(b) may be advantageous as a highly efficient lighting system tailored for broiler chickens, for example. Even though the chicken perceives a substantial color shift towards the blue spectrum and away from red, embodiments of the circuit of FIG. 11(b) may further be advantageous as a light source to permit humans to see with good color rendering over a wide dimming range.

FIGS. 13(a,b) illustrate exemplary plots 1300 of light output from the RUN 1305 and BYPASS 1310 LEDs, and their combined total output 1315, over a range of input voltage excitation.

Figure 13A:
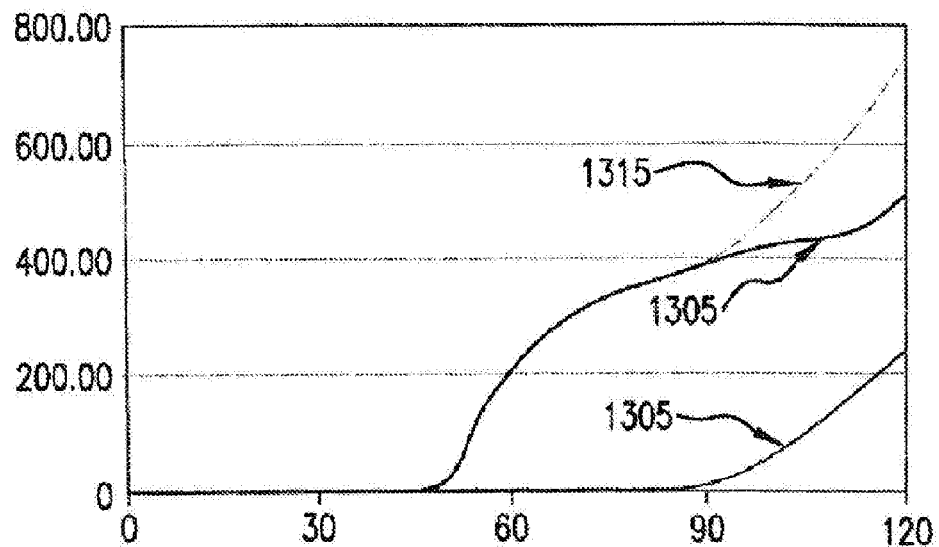
FIGS. 13A-13B illustrate exemplary plots of light output from the RUN and BYPASS LEDs, and their combined total output, over a range of input voltage excitation.

FIG. 13(a) is a plot of exemplary light output in units of lumens for an example LED lamp with a circuit substantially similar to either of those of FIGS. 11(a,b). As the AC r.m.s. voltage is increased to about 45 volts, the RUN group of LEDs starts to conduct significant forward current and output light. The current from the RUN LEDs is diverted around the BYPASS group of LEDs until the AC input excitation is further increased to about 90 volts. As the voltage continues to increase, light from the BYPASS LEDs add to the light from the RUN LEDs, causing the total light output to exceed the light output from the RUN LEDs alone.

Figure 13B:
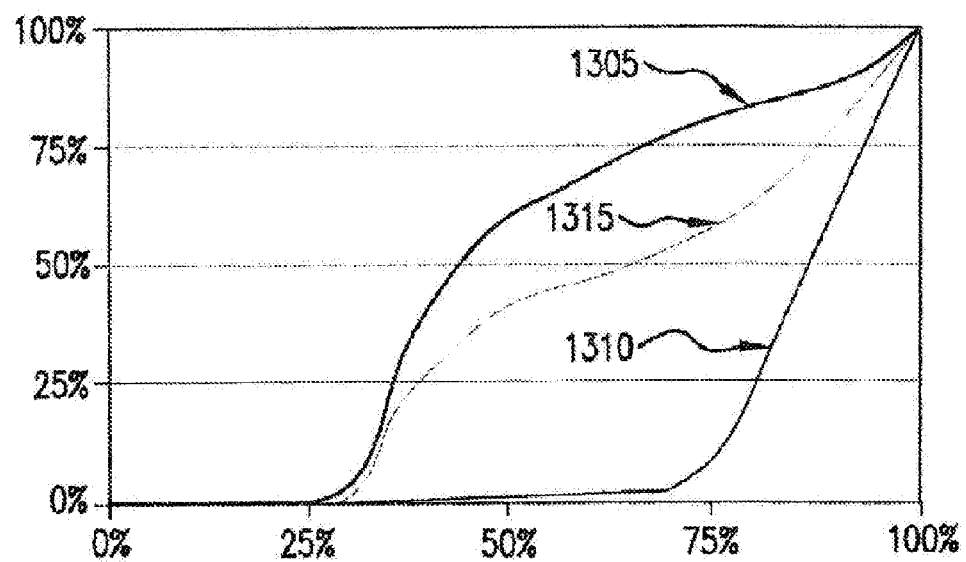

FIG. 13(b) depicts the plot of FIG. 13(a) in terms of normalized light output and percent of rated input excitation. In the depicted example, the total flux exhibits an inflection point at the point at which the BYPASS circuit begins to conduct current and output light.

Although various embodiments have been described with reference to the figures, other embodiments are possible. For example, some embodiments of a composite source may produce a maximum light intensity at a wavelength that substantially corresponds to a maximum sensitivity of the diurnal avian's spectral sensitivity. In some examples, this may advantageously enhance an efficiency associated with visual response perception and electrical energy input consumption. In some further embodiments, the composite source may produce a second highest light intensity at a wavelength that substantially corresponds to a second highest sensitivity of the diurnal avian's spectral sensitivity. In some examples, this may advantageously further enhance the efficiency associated with visual response perception and electrical energy input consumption.

In some implementations, a facility similar to the facility 100 of FIG. 1, for example, may be used to grow livestock such as swine, cows, horses, goats, diurnal avians (e.g. chickens, turkeys), or the like. By way of example and not limitation, the lighting may be used to promote the development of chickens such as breeders, broilers, or layers, for example. In various embodiments, the lighting may be sourced by one or more LED lamps, each of which may output a color temperature that is a function of the AC excitation level supplied from the controller. For different types of livestock, the color shift may be different to optimize the light exposure for each type. For example, breeders may require some periods of infrared light to promote sexual activity. Optimal spectral profiles may be developed based on published research results or empirical data, and appropriate spectral profiles may be provided by appropriate selection of type, number and color of groups of LEDs, LED light engine architecture with bypass circuitry, and dimming control profile.

One study found that the three pigments in cones of a human eye may have local sensitivity maxima, for example, at about 419, 531, and 558 nm (Dartnall et al., 1983). The study further indicates that the four pigments in a chicken eye may have local sensitivity maxima, for example, at about 415, 455, 508, and 571 nm.

Various spectral components may be advantageous for birds at different stages of development. For example, research indicates that broiler chickens under blue or green light may become significantly heavier than similar chickens exposed to red or white light. (Rozenboim et al., 2004) Some research indicates that green light may accelerate muscle growth (Halevy et al., 1998) and may stimulate growth at an early age, whereas blue light may stimulate growth in older birds (Rozenboim et al., 999, 2004). Some studies have found that young broilers have a strong preference for bright light (Davis et al., 1997).

In some embodiments, materials selection and processing may be controlled to manipulate the LED color temperature and other light output parameters (e.g., intensity, direction) so as to provide LEDs that will produce a desired composite spectral output. Appropriate selection of LEDs to provide a desired color temperature, in combination with appropriate application and threshold determination for the bypass circuit, can advantageously permit tailoring of color temperature variation over a range of input excitation.

Some implementations may be controlled in response to signals from analog or digital components, which may be discrete, integrated, or a combination of each. Some embodiments may include programmed and/or programmable devices (e.g., PLAs, PLDs, ASICs, microcontroller, microprocessor, digital signal processor (DSP)), and may include one or more data stores (e.g., cell, register, block, page) that provide single or multi-level digital data storage capability, and which may be volatile and/or non-volatile. Some control functions may be implemented in hardware, software, firmware, or a combination of any of them.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD). In some implementations, a computer program product may contain instructions that, when executed by a processor, cause the processor to adjust the color temperature and/or intensity of lighting, which may include LED lighting. Color temperature may be manipulated by a composite light apparatus that combines one or more LEDs of one or more color temperatures with one or more non-LED light sources, each having a unique color temperature and/or light output characteristic. By way of example and not limitation, multiple color temperature LEDs may be combined with one or more fluorescent, incandescent, halogen, and/or mercury lights sources to provide a desired color temperature characteristic over a range of excitation conditions.

In accordance with another embodiment, AC input excitation may be modified by other power processing circuitry. For example, a dimmer module that uses phase-control to delay turn on and/or interrupt current flow at selected points in each half cycle may be used. In some cases, harmonic improvement may still advantageously be achieved even when current is distorted by the dimmer module. Improved power factor may also be achieved where the rectified sinusoidal voltage waveform is amplitude modulated by a dimmer module, variable transformer, or rheostat, for example. In some embodiments, electrical input excitation may be substantially AC, DC (e.g., battery, rectifier, solar powered), or a combination thereof.

In one example, the excitation voltage may have a substantially sinusoidal waveform, such as line voltage at about 120 VAC at 50 or 60 Hz. In some examples, the excitation voltage may be a substantially sinusoidal waveform that has been processed by a dimming circuit, such as a phase-controlled switch that operates to delay turn on or to interrupt turn off at a selected phase in each half cycle. In some examples, the dimmer may modulate the amplitude of the AC sinusoidal voltage (e.g., AC-to-AC converter), or modulate an amplitude of the rectified sinusoidal waveform (e.g., DC-to-DC converter).

In some implementations, the amplitude of the excitation voltage may be modulated, for example, by controlled switching of transformer taps. In general, some combinations of taps may be associated with a number of different turns ratios. For example, solid state or mechanical relays may be used to select from among a number of available taps on the primary and/or secondary of a transformer so as to provide a turns ratio nearest to a desired AC excitation voltage.

In some examples, AC excitation amplitude may be dynamically adjusted by a variable transformer (e.g., variac) that can provide a smooth continuous adjustment of AC excitation voltage over an operating range. In some embodiments, AC excitation may be generated by a variable speed/voltage electro-mechanical generator (e.g., diesel powered). A generator may be operated with controlled speed and/or current parameters to supply a desired AC excitation to an LED-based light engine, such as the light engine of FIG. 1, for example. In some implementations, AC excitation to the light engine may be provided using well-known solid state and/or electro-mechanical methods that may combine AC-DC rectification, DC-DC conversion (e.g., buck-boost, boost, buck, flyback), DC-AC inversion (e.g., half- or full-bridge, transformer coupled), and/or direct AC-AC conversion. Solid state switching techniques may use, for example, resonant (e.g., quasi-resonant, resonant), zero-cross (e.g., zero-current, zero-voltage) switching techniques, alone or in combination with appropriate modulation strategies (e.g., pulse density, pulse width, pulse-skipping, demand, or the like).

Figure 14:
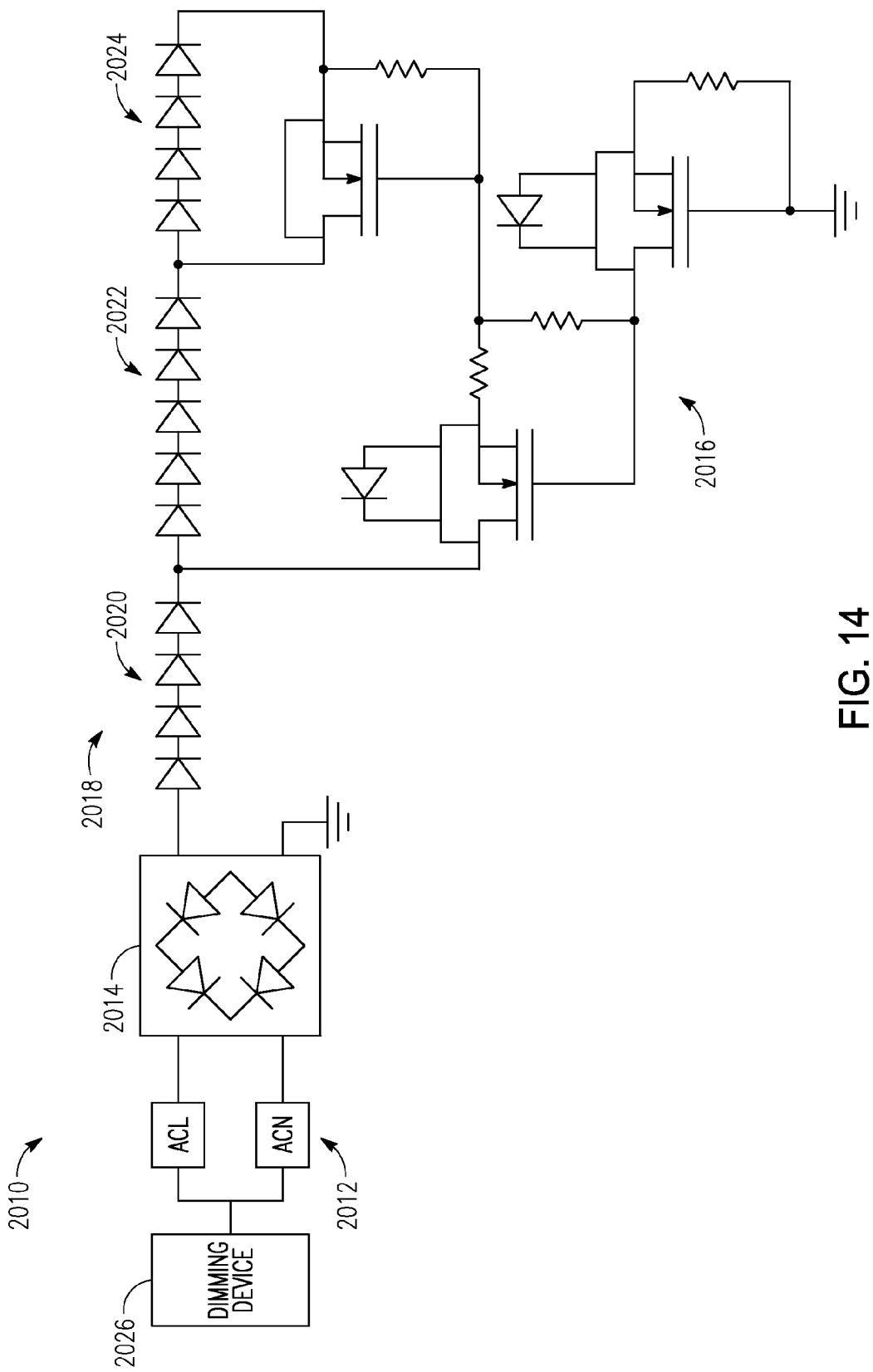
FIG. 14 shows a schematic of an exemplary conditioning circuit for an LED light engine with selective current diversion to bypass a group of LEDs while AC input excitation is below a predetermined level.

In one embodiment the circuit 2010 of FIG. 14 is utilized. As with other embodiments, the lighting assembly in this embodiment can be used for any livestock, including but not limited to poultry, turkey, geese, swine, cows, horses, goats, fish, shrimp or the like. In this embodiment each lighting assembly 120 has an AC power source 2012 input that is received by the lighting assembly 120. Each assembly utilizes a rectifier 2014 in association with driving circuitry 2016 utilizing bypass methods as described above to provide inputs to a plurality of LED elements 2018. In one embodiment a first, second and third group of plurality of LED elements 2020, 2022 and 2024 are presented with the first plurality of LED elements 2020 that cause the emission of blue wavelength light, where in one embodiment the wavelength is between 395-495 nm. In this embodiment the second and third pluralities of LED elements 2022 and 2024 preferably have LED elements that provide white light.

The lighting assemblies 120 further have a dimming device 2026 that causes the intensity of the light to be reduced to less than 3 lumens. In particular, in the circuit 2010 provided, when dimmed to low voltage levels the driving circuitry only supplies current to the first or blue plurality of LED elements 2020 such that the second and third plurality of LED elements 2022 and 2024 do not emit light. Thus a constant low intensity blue wavelength light is emitted throughout the facility 100. Further, because of the properties of LED lighting elements, the lights can be left on for long durations of time, this includes weeks and months, without burning out. In addition, when human lighting is needed the dimming device 2026 can be actuated to increase the voltage such that the current supplied by the driving circuitry 2016 reaches a predetermined level such that the second and then third plurality of LED lighting elements 2022 and 2024 effectively turn on and begin emitting light. These lighting elements 2022 and 2024 then can emit light according to the graph as provided in FIG. 13A, including greater than 200 and even 400 lumens. In this manner during times with moon lighting is not required the facility is lighted for individuals using and working within the facility.

In one embodiment the plurality of LED elements are presented in series including at least one bypass circuit as described in U.S. Pat. Pub. No. 2011/0210678. In a preferred embodiment all of the LED lights in such an arrangement emit blue wavelength light.

While a constant blue light can be emitted by the lighting assemblies 120 for a predetermined period of time, the lighting assemblies 120 similarly can emit other spectrum light including white and red. The spectrum of light emitted can be controlled by the dimming device 2026 as described in the above incorporated Grajcar references. Thus the optimum light for the animal being bred can be selected.

In operation a plurality of animals, such as avian and more particular turkeys are placed inside an enclosure such as a barn or other breeding facility. The lighting assemblies 120 are then installed at predetermined locations within the enclosure such that when operated the light being emitted by the lighting assemblies reaches at least one animal and preferably all of the animals within the facility 100.

In a preferred embodiment the lighting assemblies 120 are actuated to emit a single wavelength range of light, preferably blue wavelength for a predetermined period of time. Preferably the intensity of the light is less than 3 (three) lumens. In one embodiment the predetermined period of time is at least one hour. In another embodiment the predetermined period is at least one day, in yet another is at least one week and in another at least one month.

During the predetermined period of time the animals are radiated by the wavelengths of light producing psychological and/or physiological effects on the animals. These effects include, but are not limited to, increasing melatonin levels in an animal over a predetermined time compared to a similar animal not radiated by the wavelength of light. Another effect is an increase in body weight of an animal over a predetermined time compared to a similar animal not radiated by the wavelength of light. Another effect is an increase in adrenaline over a predetermined time compared to a similar animal not radiated by the wavelength. Another effect is the increase of yield of a plurality of animals over a predetermined period of time as compared to similar plurality of animals not constantly radiated by the wavelength light over the same period of time. Thus, the single range of wavelength of light causes and thus enhances growth in the animal over the predetermined period of time.

Thus provided is a method of increasing the growth of an animal or a yield of a plurality of animals. In particular, through the use of lighting assemblies that preferably are AC driven lighting assemblies, low intensity blue light can be emitted and radiated on animals to optimize their growth and yield. As a result all of the stated objects have been met.

This document discloses technology relating to light sources adapted to spectral sensitivities of diurnal avians. Related example implementations, techniques, or apparatus may be found in previously-filed disclosures that have common inventorship with this disclosure.

Examples of technology for dimming and color-shifting a light source with AC excitation are described with reference, for example, to the various figures of U.S. Provisional Patent Application entitled "Color Temperature Shift Control for Dimmable AC LED Lighting," Ser. No. 61/234,094, which was filed by Z. Grajcar on Aug. 14, 2009, the entire contents of which are incorporated herein by reference.

Examples of technology for improved power factor and reduced harmonic distortion for color-shifting a light source are described with reference, for example, at least to FIGS. 20A-20C of U.S. Provisional Patent Application entitled "Reduction of Harmonic Distortion for LED Loads," Ser. No. 61/233,829, which was filed by Z. Grajcar on Aug. 14, 2009, the entire contents of which are incorporated herein by reference.

Further embodiments of light engines for a lighting system are described with reference, for example, at least to FIGS. 1, 2, 5-5B, 7A-7B, and 10A-10B of U.S. Provisional Patent Application entitled "Architecture for High Power Factor and Low Harmonic Distortion LED Lighting," Ser. No. 61/255,491, which was filed by Z. Grajcar on Oct. 28, 2009, the entire contents of which are incorporated herein by reference.

Various embodiments may incorporate one or more electrical interfaces for making electrical connection from the lighting apparatus to an excitation source. An example of an electrical interface that may be used in some embodiments of a downlight is disclosed in further detail with reference, for example, at least to FIG. 1-3, or 5 of U.S. Design patent application entitled "Lamp Assembly," Ser. No. 29/342,578, which was filed by Z. Grajcar on Oct. 27, 2009, the entire contents of which are incorporated herein by reference.

Instead of a threaded screw-type interface, some embodiments may include a section of a track lighting-style receptacle to receive the dual post interface of an exemplary lamp. For example, a dual post electrical interface of the type used for GU 10 style lamps may be used. An example of an electrical interface that may be used in some embodiments of a downlight is disclosed in further detail with reference, for example, at least to FIG. 1, 2, 3, or 5 of U.S. Design patent application entitled "Lamp Assembly," Ser. No. 29/342,575, which was filed by Z. Grajcar on Oct. 27, 2009, the entire contents of which are incorporated herein by reference.

Some embodiments of a light apparatus may be integrated with packaging and/or thermal management hardware. Examples of thermal or other elements that may be advantageously integrated with the embodiments described herein are described with reference, for example, to FIG. 15 in U.S. Publ. Application 2009/0185373 A1, filed by Z. Grajcar on Nov. 19, 2008, the entire contents of which are incorporated herein by reference.

This document discloses technology relating to dimmable LED light engines adapted to spectral sensitivities of diurnal avian and humans. Related example implementations, techniques, or apparatus may be found in previously-filed disclosures that have common inventorship with this disclosure.

Various examples of apparatus and methods may relate to lighting for providing light energy at wavelengths that substantially correlate to peaks in the spectral sensitivity of the poultry. Examples of such apparatus and methods are described with reference, for example, at least to FIGS. 2A-2B of U.S. Provisional Patent Application entitled "Light Sources Adapted to Spectral Sensitivity of Diurnal Avians," Ser. No. 61/314,617, which was filed by Z. Grajcar on Mar. 17, 2010, the entire contents of which are incorporated herein by reference.

Various embodiments relate to dimmable lighting for livestock. Examples of such apparatus and methods are described with reference, for example, at least to FIGS. 3, 5A-6C of U.S. Provisional Patent Application entitled "LED Lighting for Livestock Development," Ser. No. 61/255,855, which was filed by Z. Grajcar on Oct. 29, 2009, the entire contents of which are incorporated herein by reference.

Examples of technology for dimming and color-shifting a light source with AC excitation are described with reference, for example, to the various figures of U.S. Provisional Patent Application entitled "Color Temperature Shift Control for Dimmable AC LED Lighting," Ser. No. 61/234,094, which was filed by Z. Grajcar on Aug. 14, 2009, the entire contents of which are incorporated herein by reference.

Examples of technology for improved power factor and reduced harmonic distortion for color-shifting a light source are described with reference, for example, at least to FIGS. 20A-20C of U.S. Provisional Patent Application entitled "Reduction of Harmonic Distortion for LED Loads," Ser. No. 61/233,829, which was filed by Z. Grajcar on Aug. 14, 2009, the entire contents of which are incorporated herein by reference.

Further embodiments of light engines for a lighting system are described with reference, for example, at least to FIGS. 1, 2, 5-5B, 7A-7B, and 10A-10B of U.S. Provisional Patent Application entitled "Architecture for High Power Factor and Low Harmonic Distortion LED Lighting," Ser. No. 61/255,491, which was filed by Z. Grajcar on Oct. 28, 2009, the entire contents of which are incorporated herein by reference.

Various embodiments may incorporate one or more electrical interfaces for making electrical connection from the lighting apparatus to an excitation source. An example of an electrical interface that may be used in some embodiments of a downlight is disclosed in further detail with reference, for example, at least to FIG. 1-3, or 5 of U.S. Design patent application entitled "Lamp Assembly," Ser. No. 29/342,578, which was filed by Z. Grajcar on Oct. 27, 2009, the entire contents of which are incorporated herein by reference.

Instead of a threaded screw-type interface, some embodiments may include a section of a track lighting-style receptacle to receive the dual post interface of an exemplary lamp. For example, a dual post electrical interface of the type used for GU 10 style lamps may be used. An example of an electrical interface that may be used in some embodiments of a downlight is disclosed in further detail with reference, for example, at least to FIG. 1, 2, 3, or 5 of U.S. Design patent application entitled "Lamp Assembly," Ser. No. 29/342,575, which was filed by Z. Grajcar on Oct. 27, 2009, the entire contents of which are incorporated herein by reference.

Some embodiments of a light apparatus may be integrated with packaging and/or thermal management hardware. Examples of thermal or other elements that may be advantageously integrated with the embodiments described herein are described with reference, for example, to FIG. 15 in U.S. Publ. Application 2009/0185373 A1, filed by Z. Grajcar on Nov. 19, 2008, the entire contents of which are incorporated herein by reference.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. A method of illuminating livestock with artificial light sources, the method comprising:
    generating a first light having a first light output of greater than 3 lumens;
    converting the first light to a second light comprising a spectral content having a wavelength between 395 nm (nanometers) and 495 nm and light output of less than 3 lumens at which a predetermined characteristic visual spectral response of the livestock occurs;
    maintaining the second light for a predetermined period of time of at least one hour and,
    supplying the second light to a habitat for the livestock.

2. The method of claim 1 wherein the first light is white light.

3. The method of claim 1 wherein the first light output is at least 200 lumens.

4. The method of claim 1 wherein the first light output is at least 400 lumens.

5. The method of claim 1 wherein the first light comprises a spectral content having a wavelength between 450 nm and 510 nm.

6. The method of claim 1 wherein the first light comprises a spectral content having a wavelength between 590 nm and 620 nm.

7. The method of claim 1 wherein the predetermined characteristic visual spectral response of the livestock correspond to increasing melatonin produced by the livestock during the predetermined period of time.

8. The method of claim 1 wherein the predetermined characteristic visual spectral response of the livestock correspond to an increase in adrenaline during the predetermined period of time.

9. The method of claim 1 wherein the predetermined period of time is at least one week.

10. The method of claim 1 wherein the predetermined period of time is at least one month.

11. A spectrally adapted illumination apparatus for illuminating livestock, the apparatus comprising:
    a light source to generate a first light output of greater than 3 lumens;
    a converter to convert the first light to a second light comprising a spectral content having a wavelength between 395 nm (nanometers) and 495 nm and light output of less than 3 lumens for a predetermined period of time that is at least one hour at which a predetermined characteristic visual spectral response of the livestock occurs.

* * * * *

UNITED STATES PATENT AND TRADEMARK OFFICE
CERTIFICATE OF CORRECTION

| | | |
|---|---|---|
| PATENT NO. | : 8,876,313 B2 | Page 1 of 1 |
| APPLICATION NO. | : 14/033252 | |
| DATED | : November 4, 2014 | |
| INVENTOR(S) | : Zdenko Grajcar | |

It is certified that error appears in the above-identified patent and that said Letters Patent is hereby corrected as shown below:

In the Specification

Column 7, Line 44, change "fora" to --for a--
Column 10, Line 58, change "anode" to --a node--
Column 13, Line 1, change "FIG. 1(b)" to --FIG. 11(b)--

Signed and Sealed this
Tenth Day of February, 2015

Michelle K. Lee
*Deputy Director of the United States Patent and Trademark Office*